United States Patent
Liu et al.

(10) Patent No.: US 12,096,430 B2
(45) Date of Patent: *Sep. 17, 2024

(54) CONFIGURATION FOR GROUP-COMMON DOWNLINK CHANNELS WITH REPETITIONS

(71) Applicant: QUALCOMM Incorporated, San Diego, CA (US)

(72) Inventors: Le Liu, San Jose, CA (US); Alberto Rico Alvarino, San Diego, CA (US); Peter Gaal, San Diego, CA (US); Kazuki Takeda, Minato-Ku (JP); Jing Sun, San Diego, CA (US); Wanshi Chen, San Diego, CA (US); Ayan Sengupta, San Diego, CA (US); Juan Montojo, San Diego, CA (US); Mostafa Khoshnevisan, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,746

(22) Filed: Jun. 23, 2023

(65) Prior Publication Data
US 2023/0337234 A1     Oct. 19, 2023

Related U.S. Application Data

(63) Continuation of application No. 17/472,452, filed on Sep. 10, 2021, now Pat. No. 11,729,769.
(Continued)

(51) Int. Cl.
*H04L 12/28*     (2006.01)
*H04L 1/08*      (2006.01)
*H04W 72/1273*   (2023.01)

(52) U.S. Cl.
CPC .......... *H04W 72/1273* (2013.01); *H04L 1/08* (2013.01)

(58) Field of Classification Search
CPC ........................... H04L 1/08; H04W 72/1273
See application file for complete search history.

(56) References Cited

U.S. PATENT DOCUMENTS

| 10,952,231 B2 | 3/2021 | Liou |
| 2017/0374570 A1 | 12/2017 | Yi et al. |

(Continued)

FOREIGN PATENT DOCUMENTS

| JP | 2022540257 A | 9/2022 |
| WO | WO2020143617 A1 | 7/2020 |

OTHER PUBLICATIONS

International Search Report and Written Opinion—PCT/US2021/050101—ISA/EPO—Mar. 14, 2022.
(Continued)

*Primary Examiner* — Elisabeth Benoit Magloire
(74) *Attorney, Agent, or Firm* — Holland & Hart LLP QUALCOMM Incorporated

(57) ABSTRACT

Methods, systems, and devices for wireless communications are described. A user equipment (UE) may receive a configuration for a group-common physical downlink shared channel (PDSCH), where the group-common PDSCH is repeated for a number of repetitions. Accordingly, the UE may determine this number of repetitions and then monitor for the group-common PDSCH based on the number of repetitions. In some implementations, the group-common PDSCH may include a semi-static repetition scheme, where the number of repetitions is indicated via a group aggregation factor. Additionally or alternatively, the group-common PDSCH may include a dynamic repetition scheme, where the number of repetitions is indicated via a group repetition number. Additionally, the techniques described herein may (Continued)

enable the configuration for the repeated group-common PDSCH to include gaps between each repetition of the group-common PDSCH and for the UE to transmit acknowledgment feedback for the repetitions of the group-common PDSCH.

30 Claims, 19 Drawing Sheets

Related U.S. Application Data

(60) Provisional application No. 63/090,036, filed on Oct. 9, 2020.

(56) References Cited

U.S. PATENT DOCUMENTS

| | | | |
|---|---|---|---|
| 2018/0270851 A1 | 9/2018 | Bhattad et al. | |
| 2018/0295651 A1 | 10/2018 | Cao et al. | |
| 2018/0309544 A1* | 10/2018 | Hwang | H04W 72/23 |
| 2018/0368142 A1 | 12/2018 | Liou | |
| 2019/0053280 A1 | 2/2019 | Rico Alvarino et al. | |
| 2019/0254053 A1* | 8/2019 | Ying | H04L 5/00 |
| 2019/0349964 A1 | 11/2019 | Liou | |
| 2020/0022144 A1 | 1/2020 | Papasakellariou | |
| 2020/0106559 A1 | 4/2020 | Vilaipornsawai et al. | |
| 2020/0275474 A1 | 8/2020 | Chen | |
| 2020/0367208 A1 | 11/2020 | Khoshnevisan et al. | |
| 2021/0051652 A1 | 2/2021 | Khoshnevisan et al. | |
| 2021/0176762 A1 | 6/2021 | Islam et al. | |
| 2021/0320753 A1 | 10/2021 | Shimezawa et al. | |
| 2022/0006595 A1* | 1/2022 | Blankenship | H04W 72/23 |
| 2022/0104237 A1* | 3/2022 | Muruganathan | H04W 72/51 |
| 2022/0116972 A1 | 4/2022 | Liu et al. | |
| 2022/0216944 A1* | 7/2022 | Muruganathan | H04W 72/0446 |
| 2022/0264340 A1* | 8/2022 | Gao | H04L 5/001 |
| 2022/0304019 A1* | 9/2022 | Takahashi | H04L 5/0012 |
| 2022/0322362 A1* | 10/2022 | Muruganathan | H04L 5/0035 |
| 2022/0369339 A1 | 11/2022 | Zhu et al. | |
| 2023/0300816 A1* | 9/2023 | Guo | H04L 1/1822 370/329 |

OTHER PUBLICATIONS

Moderator (OPPO): "Summary of Email Thread [101-e-NR-eMIMO-MultiTRP-02]", 3GPP Draft, 3GPP TSG RAN WG1 #101, R1-2004908, 3rd Generation Partnership Project (3GPP), Mobile Competence Centre, 650, Route Des Lucioles, F-06921 Sophia-Antipolis Cedex, France, vol. RAN WG1, No. e-Meeting, May 20, 2020-Jun. 5, 2020, Jun. 4, 2020 (Jun. 4, 2020), XP051893286, 12 Pages, p. 8, Proposal 1.

OPPO: "Control Signaling for Multi-TRP Based URLLC Enhancement", 3GPP Draft, 3GPP TSG RAN WG1 Meeting #98bis, R1-1910119, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019), XP051808073, 3 Pages, Section 1, p. 2 Penultimate Par., Above Table 1.

Partial International Search Report—PCT/US2021/050101—ISA/EPO—Dec. 20, 2021.

* cited by examiner

CONFIGURATION FOR GROUP-COMMON DOWNLINK CHANNELS WITH REPETITIONS

CROSS REFERENCE

The present Application for patent is a continuation of U.S. patent application Ser. No. 17/472,452 by LIU et al., entitled "CONFIGURATION FOR GROUP-COMMON DOWNLINK CHANNELS WITH REPETITIONS" filed Sep. 10, 2021, which claims the benefit of U.S. Provisional Patent Application No. 63/090,036 by LIU et al., entitled "CONFIGURATION FOR GROUP-COMMON DOWNLINK CHANNELS WITH REPETITIONS," filed Oct. 9, 2020, assigned to the assignee hereof, and expressly incorporated by reference herein.

FIELD OF TECHNOLOGY

The following relates to wireless communications, including configurations for group-common downlink channels with repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a base station may communicate with multiple UEs at once. For example, the base station may use broadcasted transmissions or multicasted transmissions to convey a same message to the multiple UEs. Rather than specifically configuring the transmissions for each UE, the base station may configure group-common transmissions for the multiple UEs and indicate these configurations to the multiple UEs to enable the multiple UEs to monitor for and receive these group-common transmissions. Efficient techniques are desired to support successful reception and decoding of group-common transmissions at the multiple UEs.

SUMMARY

The described techniques relate to improved methods, systems, devices, and apparatuses that support configurations for group-common downlink channels with repetitions. Generally, the described techniques provide for a user equipment (UE) to receive a configuration for a group-common physical downlink shared channel (PDSCH), where the configuration includes an indication that the group-common PDSCH is repeated for a number of repetitions. For example, the group-common PDSCH may include a group-common dynamic PDSCH, one or more group-common semi-persistent scheduling (SPS) PDSCHs, or a combination thereof. Accordingly, the UE may determine the number of repetitions and then monitor for the group-common PDSCH based on the number of repetitions. In some implementations, the same configuration or a different configuration may indicate a semi-static repetition scheme for the group-common PDSCH, where the number of repetitions is indicated via a group aggregation factor. Additionally or alternatively, the same configuration or a different configuration may indicate a dynamic repetition scheme for the group-common PDSCH, where the number of repetitions is indicated via a group repetition number.

Additionally, the configuration for the group-common PDSCH may include an indication of a gap that occurs between each repetition of the group-common PDSCH. For example, the gap may include a number of slots (e.g., or a different length transmission interval) between each repetition of the group-common PDSCH, where the UE does not expect to receive an additional configuration scheduling an additional group-common PDSCH during the gap. This gap may be signaled semi-statically (e.g., via radio resource control (RRC) signaling) or dynamically (e.g., via a time domain resource allocation (TDRA) entry with the gap included). In some implementations, the UE may transmit acknowledgment feedback for the group-common PDSCH and the number of repetitions for the group-common PDSCH. For example, the UE may use a Type 1 acknowledgment codebook or a Type 2 acknowledgment codebook for transmitting the acknowledgment feedback. For both Types, the UE may determine a number of candidate occasions for receiving the group-common PDSCHs and for determining the acknowledgment feedback. The UE may determine the number of candidate occasions based on the group aggregation factor, group repetition number, the gap between the repetitions, feedback timing indicator field values, slot offsets, etc., where each of these factors are used depending on which Type of acknowledgment codebook is used or configured.

A method for wireless communications at a UE is described. The method may include receiving, from a base station, a repetition configuration for a group-common downlink shared channel, the group-common downlink shared channel including one or more downlink shared channels, one or more semi-persistent downlink shared channels different from the one or more downlink shared channels, or a combination thereof, determining a number of repetitions for the group-common downlink shared channel based on the repetition configuration, and monitoring for the group-common downlink shared channel from the base station based on the determined number of repetitions.

An apparatus for wireless communications at a UE is described. The apparatus may include a processor, memory in electronic communication with the processor, and instructions stored in the memory. The instructions may be executable by the processor to cause the apparatus to receive, from a base station, a repetition configuration for a group-common downlink shared channel, the group-common downlink shared channel including one or more downlink shared channels, one or more semi-persistent downlink shared channels different from the one or more downlink shared channels, or a combination thereof, determine a number of repetitions for the group-common downlink shared channel based on the repetition configuration, and monitor for the group-common downlink shared channel from the base station based on the determined number of repetitions.

Another apparatus for wireless communications at a UE is described. The apparatus may include means for receiving, from a base station, a repetition configuration for a group-common downlink shared channel, the group-common downlink shared channel including one or more downlink shared channels, one or more semi-persistent downlink shared channels different from the one or more downlink shared channels, or a combination thereof, means for determining a number of repetitions for the group-common downlink shared channel based on the repetition configuration, and means for monitoring for the group-common downlink shared channel from the base station based on the determined number of repetitions.

A non-transitory computer-readable medium storing code for wireless communications at a UE is described. The code may include instructions executable by a processor to receive, from a base station, a repetition configuration for a group-common downlink shared channel, the group-common downlink shared channel including one or more downlink shared channels, one or more semi-persistent downlink shared channels different from the one or more downlink shared channels, or a combination thereof, determine a number of repetitions for the group-common downlink shared channel based on the repetition configuration, and monitor for the group-common downlink shared channel from the base station based on the determined number of repetitions.

In some examples of the method, apparatuses, and non-transitory computer-readable medium described herein, receiving the group-common configuration for the downlink shared channel may include operations, features, means, or instructions for receiving, from the base station, a semi-static repetition configuration for the repetition configuration.

In some examples of the method, apparatuses, and non-transitory computer-readable medium described herein, receiving the semi-static repetition configuration may include operations, features, means, or instructions for receiving, from the base station, the semi-static repetition configuration via radio resource control signaling.

In some examples of the method, apparatuses, and non-transitory computer-readable medium described herein, the semi-static repetition configuration includes a group aggregation factor, where the number of repetitions may be determined based on the group aggregation factor and on the group-common downlink shared channel.

In some examples of the method, apparatuses, and non-transitory computer-readable medium described herein, the group aggregation factor for the one or more group-common downlink shared channels or the one or more semi-persistent group-common downlink shared channels may be pre-defined as one.

Some examples of the method, apparatuses, and non-transitory computer-readable medium described herein may further include operations, features, means, or instructions for determining the group aggregation factor for the one or more semi-persistent group-common downlink shared channels based on the group aggregation factor for the one or more group-common downlink shared channels, where the repetition configuration includes group radio network temporary identifiers associated with the one or more semi-persistent group-common downlink shared channels.

Some examples of the method, apparatuses, and non-transitory computer-readable medium described herein may further include operations, features, means, or instructions for determining the group aggregation factor for the one or more group-common downlink shared channels with a group radio network temporary identifier based on an aggregation factor of a unicast downlink shared channel configured to the UE.

In some examples of the method, apparatuses, and non-transitory computer-readable medium described herein, receiving the configuration for the downlink shared channel may include operations, features, means, or instructions for receiving, from the base station, a dynamic repetition configuration for the repetition configuration.

In some examples of the method, apparatuses, and non-transitory computer-readable medium described herein, the dynamic repetition configuration includes a group repetition number parameter via a time-domain resource allocation indication, where the number of repetitions may be determined based on the group repetition number parameter.

Some examples of the method, apparatuses, and non-transitory computer-readable medium described herein may further include operations, features, means, or instructions for receiving, from the base station, a gap configuration including an indication of a gap that occurs between repetitions of the group-common downlink shared channel.

In some examples of the method, apparatuses, and non-transitory computer-readable medium described herein, receiving the gap configuration may include operations, features, means, or instructions for receiving, from the base station, the gap configuration semi-statically via radio resource control signaling, dynamically via a time domain resource allocation indication including a gap value for the gap, or a combination thereof.

In some examples of the method, apparatuses, and non-transitory computer-readable medium described herein, the gap includes a number of slots between each repetition of the group-common downlink shared channel, where a length of each slot may be based on a configuration of a bandwidth part used for carrying the group-common downlink shared channel.

In some examples of the method, apparatuses, and non-transitory computer-readable medium described herein, the gap may be configured independently for the one or more downlink shared channels and for the one or more semi-persistent downlink shared channels.

In some examples of the method, apparatuses, and non-transitory computer-readable medium described herein, the number of repetitions combined with the gap between the repetitions does not exceed a periodicity configured for a semi-persistent downlink shared channel.

Some examples of the method, apparatuses, and non-transitory computer-readable medium described herein may further include operations, features, means, or instructions for transmitting, to the base station, an acknowledgment feedback message for the group-common downlink shared channel based on the monitoring, where the acknowledgment feedback message indicates a successful or unsuccessful reception of the group-common downlink shared channel based on the number of repetitions.

Some examples of the method, apparatuses, and non-transitory computer-readable medium described herein may further include operations, features, means, or instructions for receiving, from the base station, a configuration for a Type 1 acknowledgment codebook for transmitting the acknowledgment feedback message.

Some examples of the method, apparatuses, and non-transitory computer-readable medium described herein may further include operations, features, means, or instructions for determining a plurality of occasions for the monitoring for the group-common downlink shared channel based on the number of repetitions and a gap value representing a gap between each repetition of the group-common downlink shared channel and transmitting, to the base station, a single acknowledgment feedback message for the plurality of occasions based on the Type 1 acknowledgment codebook.

Some examples of the method, apparatuses, and non-transitory computer-readable medium described herein may further include operations, features, means, or instructions for receiving, from the base station, a configuration for a Type 2 acknowledgment codebook for transmitting the acknowledgment feedback message.

Some examples of the method, apparatuses, and non-transitory computer-readable medium described herein may further include operations, features, means, or instructions for determining a plurality of occasions for the monitoring for the group-common downlink shared channel based on a feedback timing indicator field value between a last repetition of the group-common downlink shared channel and the acknowledgment feedback message, an offset value between a downlink control channel carrying the repetition configuration and a first repetition of the group-common downlink shared channel, the number of repetitions, a gap value representing a gap between each repetition of the group-common downlink shared channel, or a combination thereof and transmitting, to the base station, the acknowledgment feedback message for the plurality of occasions based on the Type 2 acknowledgment codebook.

In some examples of the method, apparatuses, and non-transitory computer-readable medium described herein, the repetition configuration includes a group radio network temporary identifier shared by a plurality of UEs including at least the UE.

A method for wireless communications at a base station is described. The method may include determining a number of repetitions for a group-common downlink shared channel, the group-common downlink shared channel including one or more downlink shared channels, one or more semi-persistent downlink shared channels different from the one or more downlink shared channels, or a combination thereof, transmitting, to one or more UEs, a repetition configuration for the group-common downlink shared channel, the repetition configuration including an indication for the determined number of repetitions, and transmitting, to the one or more UEs, the group-common downlink shared channel based on the determined number of repetitions.

An apparatus for wireless communications at a base station is described. The apparatus may include a processor, memory in electronic communication with the processor, and instructions stored in the memory. The instructions may be executable by the processor to cause the apparatus to determine a number of repetitions for a group-common downlink shared channel, the group-common downlink shared channel including one or more downlink shared channels, one or more semi-persistent downlink shared channels different from the one or more downlink shared channels, or a combination thereof, transmit, to one or more UEs, a repetition configuration for the group-common downlink shared channel, the repetition configuration including an indication for the determined number of repetitions, and transmit, to the one or more UEs, the group-common downlink shared channel based on the determined number of repetitions.

Another apparatus for wireless communications at a base station is described. The apparatus may include means for determining a number of repetitions for a group-common downlink shared channel, the group-common downlink shared channel including one or more downlink shared channels, one or more semi-persistent downlink shared channels different from the one or more downlink shared channels, or a combination thereof, means for transmitting, to one or more UEs, a repetition configuration for the group-common downlink shared channel, the repetition configuration including an indication for the determined number of repetitions, and means for transmitting, to the one or more UEs, the group-common downlink shared channel based on the determined number of repetitions.

A non-transitory computer-readable medium storing code for wireless communications at a base station is described. The code may include instructions executable by a processor to determine a number of repetitions for a group-common downlink shared channel, the group-common downlink shared channel including one or more downlink shared channels, one or more semi-persistent downlink shared channels different from the one or more downlink shared channels, or a combination thereof, transmit, to one or more UEs, a repetition configuration for the group-common downlink shared channel, the repetition configuration including an indication for the determined number of repetitions, and transmit, to the one or more UEs, the group-common downlink shared channel based on the determined number of repetitions.

In some examples of the method, apparatuses, and non-transitory computer-readable medium described herein, transmitting the group-common configuration for the downlink shared channel may include operations, features, means, or instructions for transmitting, to the one or more UEs, a semi-static repetition configuration for the repetition configuration.

In some examples of the method, apparatuses, and non-transitory computer-readable medium described herein, transmitting the semi-static repetition configuration may include operations, features, means, or instructions for transmitting, to the one or more UEs, the semi-static repetition configuration via radio resource control signaling.

In some examples of the method, apparatuses, and non-transitory computer-readable medium described herein, the semi-static repetition configuration includes a group aggregation factor, where the number of repetitions may be indicated based on the group aggregation factor and on the group-common downlink shared channel.

In some examples of the method, apparatuses, and non-transitory computer-readable medium described herein, transmitting the configuration for the downlink shared channel may include operations, features, means, or instructions for transmitting, to the one or more UEs, a dynamic repetition configuration for the repetition configuration.

In some examples of the method, apparatuses, and non-transitory computer-readable medium described herein, the dynamic repetition configuration includes a group repetition number parameter via a time-domain resource allocation indication, where the number of repetitions may be indicated based on the group repetition number parameter.

Some examples of the method, apparatuses, and non-transitory computer-readable medium described herein may further include operations, features, means, or instructions for transmitting, to the one or more UEs, a gap configuration including an indication of a gap that occurs between repetitions of the group-common downlink shared channel.

In some examples of the method, apparatuses, and non-transitory computer-readable medium described herein, transmitting the gap configuration may include operations, features, means, or instructions for transmitting, to the one or more UEs, the gap configuration semi-statically via radio resource control signaling, dynamically via a time domain resource allocation indication including a gap value for the gap, or a combination thereof.

In some examples of the method, apparatuses, and non-transitory computer-readable medium described herein, the gap includes a number of slots between each repetition of the group-common downlink shared channel, where a length of each slot may be based on a configuration of a bandwidth part used for carrying the group-common downlink shared channel.

In some examples of the method, apparatuses, and non-transitory computer-readable medium described herein, the gap may be configured independently for the one or more downlink shared channel and for the one or more semi-persistent downlink shared channels.

In some examples of the method, apparatuses, and non-transitory computer-readable medium described herein, the number of repetitions combined with the gap between the repetitions does not exceed a periodicity configured for a semi-persistent downlink shared channel.

Some examples of the method, apparatuses, and non-transitory computer-readable medium described herein may further include operations, features, means, or instructions for receiving, from the one or more UEs, an acknowledgment feedback message for the group-common downlink shared channel based on the transmitting the group-common downlink shared channel, where the acknowledgment feedback message indicates a successful or unsuccessful reception of the group-common downlink shared channel based on the number of repetitions.

Some examples of the method, apparatuses, and non-transitory computer-readable medium described herein may further include operations, features, means, or instructions for transmitting a configuration for a Type 1 acknowledgment codebook for the one or more UEs to transmit the acknowledgment feedback message, where the acknowledgment feedback message may be received based on the Type 1 acknowledgment codebook.

Some examples of the method, apparatuses, and non-transitory computer-readable medium described herein may further include operations, features, means, or instructions for transmitting a configuration for a Type 2 acknowledgment codebook for the one or more UEs to transmit the acknowledgment feedback message, where the acknowledgment feedback message may be received based on the Type 2 acknowledgment codebook.

In some examples of the method, apparatuses, and non-transitory computer-readable medium described herein, the repetition configuration includes a group radio network temporary identifier indicating the group-common downlink shared channel may be transmitted for the one or more UEs.

DETAILED DESCRIPTION

Figure 1:
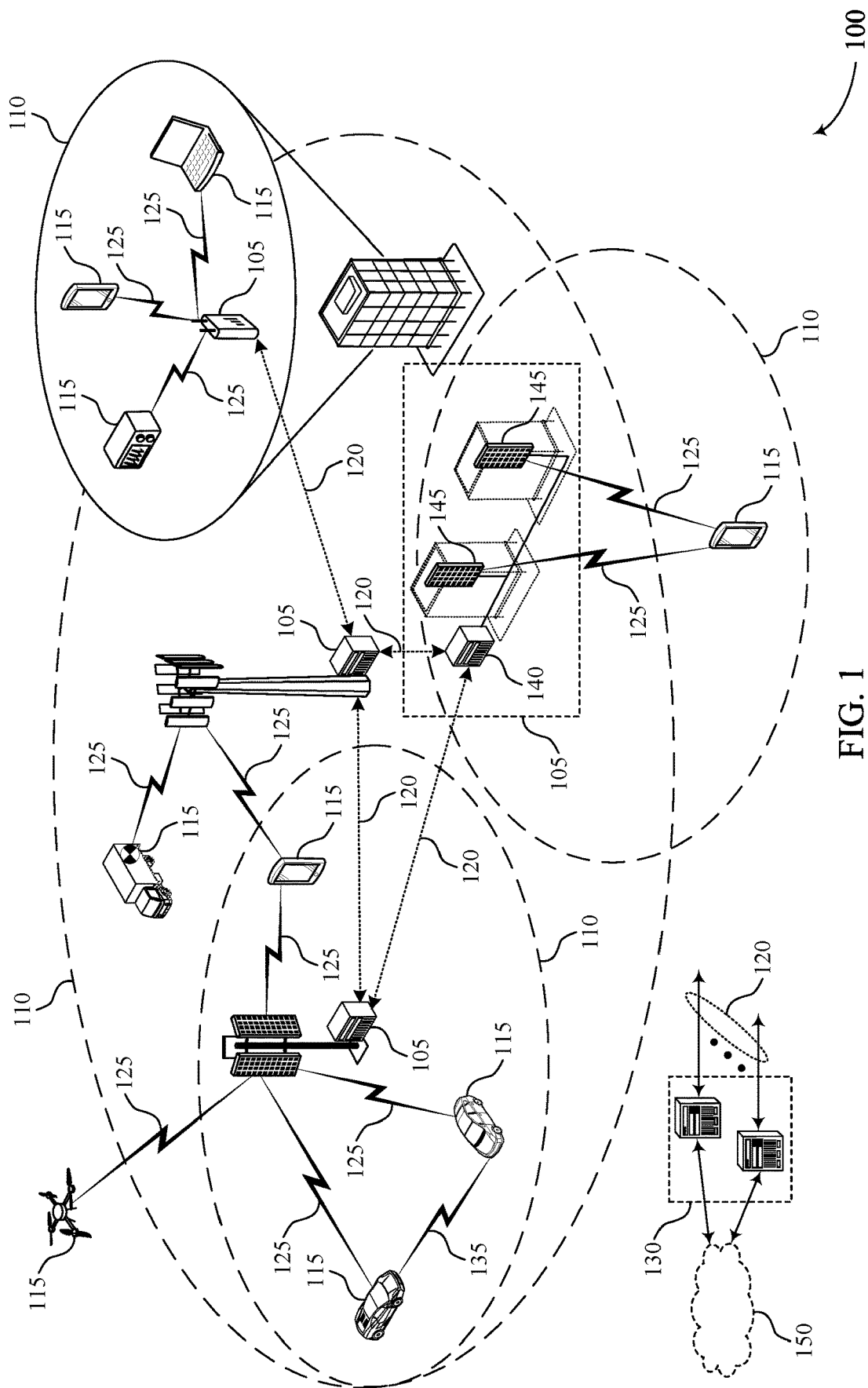
FIG. 1 illustrates an example of a wireless communications system that supports configurations for group-common downlink channels with repetitions in accordance with aspects of the present disclosure.

A user equipment (UE) and a base station may support semi-static and/or dynamic repetitions of a physical downlink shared channel (PDSCH) in consecutive slots. For example, the base station may configure the UE with a repetition configuration (e.g., including a pdsch-AggregationFactor parameter, a RepNumR16 parameter, etc.) for the UE to apply to unicast dynamic PDSCHs and unicast semi-persistent scheduling (SPS) PDSCHs. Additionally, UEs in a wireless communications system may also support group-common physical downlink control channels (PDCCHs) and PDSCHs (e.g., multicast data) as well as acknowledgment feedback for the group-common transmissions. However, configuring slot-level repetitions for group-common PDSCHs have yet to be defined.

As described herein, a UE may be configured with one or more group-common PDSCHs such as a group-common dynamic PDSCH, one or more group-common SPS PDSCHs, or a combination thereof, where the group-common PDSCHs are further configured with repetitions. The one or more group-common dynamic PDSCH may include a cyclic redundancy check (CRC) scrambled by different group radio network temporary identifiers (G-RNTI(s)), and the one or more group-common SPS PDSCHs may include a CRC scrambled by different configured scheduled G-RNTIs (G-CS-RNTI(s)). The SPS PDSCH may be associated with a G-CS-RNTI. In a first option for the repetitions, the group-common PDSCHs may be independently configured with a group aggregation factor (e.g., pdsch-Aggregation- Factor_group) to indicate semi-static repetitions for the group-common PDSCHs. Alternatively, in a second option for the repetitions, the group-common PDSCHs may be configured with a group repetition parameter (e.g., RepNum_group) to indicate a dynamic repetition number for the group-common PDSCHs. In some cases, a UE may not be configured with both options for group-common PDSCHs that have a same G-RNTI, same G-CS-RNTI, or the associated pair of G-RNTI and G-CS-RNTI configured for the same group of UEs to receive the same service, but the different options may be configured independently for group-common PDSCHs with different G-RNTIs or SPS group-common PDSCH with different GCS-RNTIs. The UE may also be configured with a gap between each repetition of the group-common PDSCHs.

Additionally, the UE may be configured to transmit acknowledgment feedback for the group-common PDSCHs with the configured repetitions. In some cases, the UE may transmit the acknowledgment feedback using a Type 1 acknowledgment codebook or a Type 2 acknowledgment codebook. For both Types, the UE may determine a number of candidate occasions for receiving the group-common PDSCHs and for determining the acknowledgment feedback. The UE may determine the number of candidate occasions based on the group aggregation factor, group repetition number, the gap between the repetitions, feedback timing indicator field values, slot offsets, etc., where each of these factors are used depending on which Type of acknowledgment codebook is used or configured.

Aspects of the disclosure are initially described in the context of wireless communications systems. Additionally, aspects of the disclosure are illustrated by an additional wireless communications system, examples of repetition schemes, acknowledgment feedback configurations, and a process flow. Aspects of the disclosure are further illustrated by and described with reference to apparatus diagrams, system diagrams, and flowcharts that relate to configurations for group-common downlink channels with repetitions.

FIG. 1 illustrates an example of a wireless communications system 100 that supports configurations for group-common downlink channels with repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless devices in wireless communications system 100 may support semi-static PDSCH repetitions in consecutive slots. For example, a UE 115 may be configured with an aggregation factor (e.g., pdsch-AggregationFactor) in a configuration message for the PDSCH (e.g., pdsch-Config) to indicate the semi-static repetitions, where the UE applies the aggregation factor to unicast dynamic PDSCHs, unicast SPS PDSCHs, or both. Additionally, the wireless devices may support semi-static or dynamic PDSCH repetitions in consecutive slots. For example, for URLLC, a UE 115 may be configured with more than one unicast SPS PDSCHs. In some cases, the aggregation factor (e.g., pdsch-AggregationFactor) for the SPS PDSCHs per configuration message (e.g., sps-Config) may be different from that of a unicast dynamic PDSCH in a corresponding configuration message (e.g., pdsch-Config) and may be different based on a BWP for the different PDSCHs.

For a multi-transmissions reception point (TRP) configuration (e.g., a UE 115 includes multiple TRPs for communications with different devices, communications in different directions, etc.), a UE 115 may be configured with a dynamic indication of repetitions (e.g., RepNumR16) included in one entry of a time domain resource allocation (TDRA) table for the PDSCH. However, when a UE 115 is configured with the dynamic indication of repetitions (e.g., RepNumR16), the UE 115 may not expect to be configured with the semi-static indication of repetitions (e.g., pdsch-AggregationFactor). That is, if a UE 115 is configured with a higher layer parameter for the repetitions of a PDSCH (e.g., repetitionNumber-16) or if the UE 115 is configured by a different repetition scheme (e.g., repetitionSchemeConfig-r16) set to a particular multiplexing scheme (e.g., one of FDMSchemeA, FDMSchemeB, and TDMSchemeA), the UE 115 may not expect to be configured with the semi-static indication of repetitions (e.g., pdsch-AggregationFactor or pdsch-AggregationFactor-r16).

Additionally, the UEs 115 (e.g., in an RRC connected state with a base station 105 or with a different wireless device) in wireless communications system 100 may support a group-common physical downlink control channel (PDCCH) with a CRC scrambled by a common radio network temporary identifier (RNTI) to schedule a group-common PDSCH, where the scrambling of the group-common PDSCH is based on the same common RNTI. The UEs 115 may also support HARQ acknowledgment (HARQ-ACK) feedback for multicast transmissions (e.g., group-common messages). Additionally, the UEs 115 may support FDM between unicast PDSCH and group-common PDSCH in a slot based on UE capability. The UEs 115 may also support slot-level repetition for group-common PDSCH. However, configurations for slot-level repetition for group-common PDSCHs have yet to be decided or determined.

Wireless communications system 100 may support efficient techniques for signaling configurations for group-common downlink channels (e.g., group-common PDSCHs) with repetitions for the group-common downlink channels. For example, a UE 115 may receive a configuration for a group-common PDSCH, where the configuration includes an indication that the group-common PDSCH is repeated for a number of repetitions. In some implementations, the group-common PDSCH may include one or more group-common dynamic PDSCHs, one or more group-common SPS PDSCHs, or a combination thereof. Accordingly, the UE 115 may determine this number of repetitions and then monitor for the group-common PDSCH based on the number of repetitions. In some implementations, the group-common PDSCH may include a semi-static repetition scheme, where the number of repetitions is indicated via a group aggregation factor. Additionally or alternatively, the group-common PDSCH may include a dynamic repetition scheme, where the number of repetitions is indicated via a group repetition number. Additionally, the techniques described herein may enable the configuration for the repeated group-common PDSCH to include gaps between each repetition of the group-common PDSCH and for the UE 115 to transmit acknowledgment feedback (e.g., HARQ-ACK feedback) for the repetitions of the group-common PDSCH.

Figure 2:
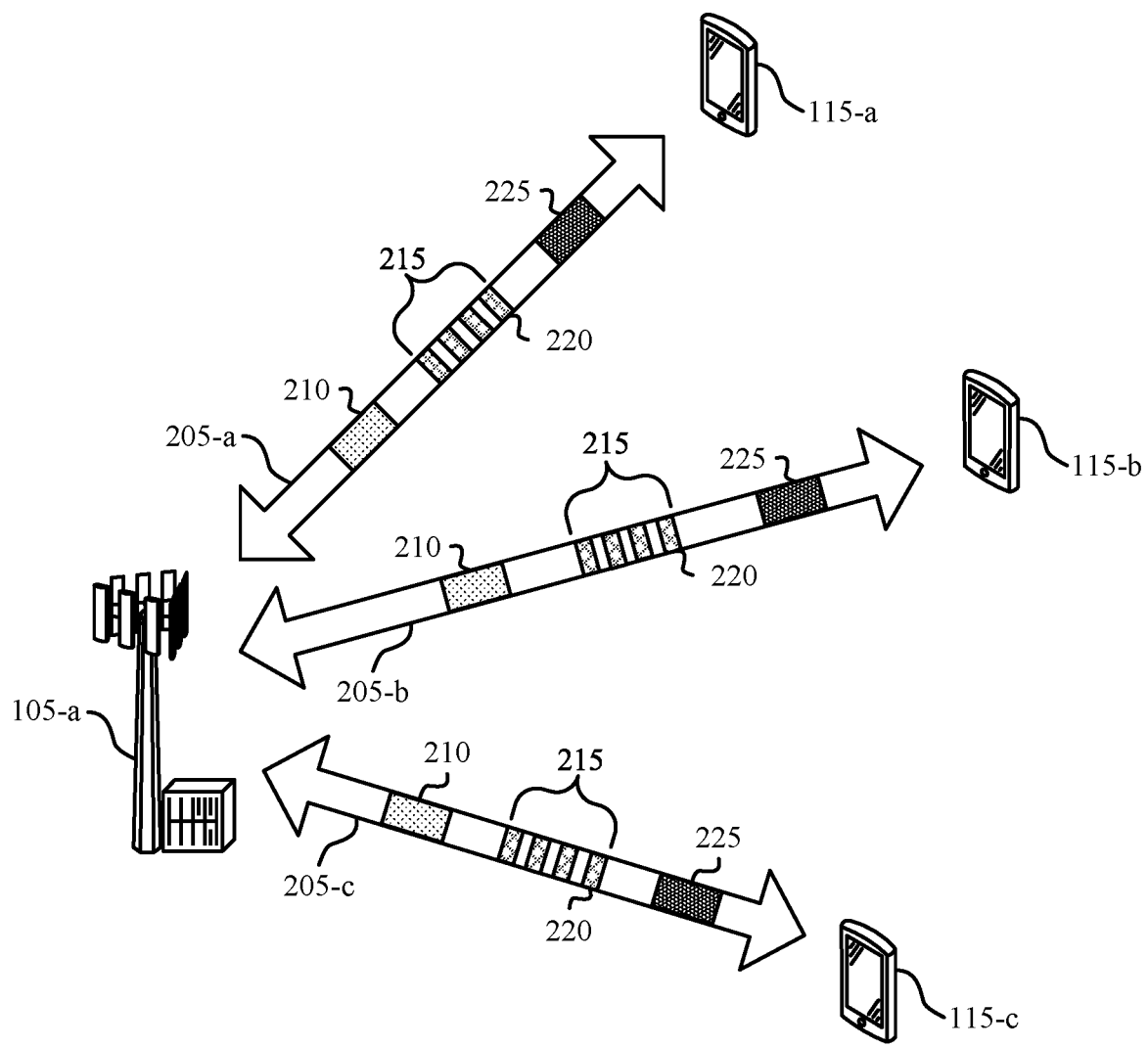
FIG. 2 illustrates an example of a wireless communications system that supports configurations for group-common downlink channels with repetitions in accordance with aspects of the present disclosure.

FIG. 2 illustrates an example of a wireless communications system 200 that supports configurations for group-common downlink channels with repetitions in accordance with aspects of the present disclosure. Wireless communications system 200 may implement aspects of wireless communications system 100. For example, wireless communications system 200 may include a base station 105-a, a UE 115-a, a UE 115-b, and a UE 115-c, which may represent examples of corresponding base stations 105 and UEs 115, respectively, as described with reference to FIG. 1.

As described herein, base station 105-a may configure a group-common downlink shared channel (e.g., a group-common PDSCH) with repetitions. For example, base station 105-a may configure UE 115-a, UE 115-b, and UE 115-c with one or more group-common dynamic downlink shared channel (e.g., group-common dynamic PDSCH), one or more group-common SPS downlink shared channels (e.g., group-common SPS PDSCHs), or both. Accordingly, the one or more group-common downlink shared channel and the one or more group-common SPS downlink shared channel may each be repeated a number of times to increase a likelihood of successful reception and decoding at each UE 115. In some implementations, the one or more group-common downlink shared channel and the one or more group-common SPS downlink shared channel may have a same number of repetitions configured together or may have different numbers of repetitions configured separately for each type of downlink shared channel.

Additionally, the configurations for the group-common dynamic downlink shared channels may include a CRC scrambled by a G-RNTI to indicate that the dynamic downlink shared channel is group common and transmitted to the multiple UEs 115. Similarly, the configurations for the group-common SPS downlink shared channels may include a CRC scrambled by a G-CS-RNTI to indicate that the SPS downlink shared channels are group common and transmitted to the multiple UEs 115. A UE 115 may be configured in different UE groups and receive different multicast services. Therefore, the UE 115 may be configured to monitor one or more group-common dynamic PDSCHs with a CRC scrambled by a different G-RNTI and one or more group-common SPS PDSCHs with a CRC scrambled by a different G-CS-RNTI. Base station 105-a may transmit the group-common downlink shared channels to the multiple UEs 115 via multicast transmissions, broadcasted transmissions, or another technique that allows base station 105-a to transmit a same message to the multiple UEs 115.

In some implementations, the group-common dynamic downlink shared channels (e.g., one or more downlink shared channels) may include downlink shared channels that are configured by base station 105-a and transmitted to the UEs 115 as needed. For example, if base station 105-a determines downlink data is available to be transmitted to the UEs 115 (e.g., multicast data), base station 105-a may then transmit a downlink control channel (e.g., group-common downlink control channel, group-common PDCCH, etc.) scheduling a dynamic downlink shared channel to convey the downlink data to the UEs 115. Additionally or alternatively, the group-common SPS downlink shared channels may include downlink shared channels allocated on a semi-persistent basis that can be used to convey downlink data to the UEs 115 (e.g., multicast data). For example, base station 105-a may configure resources that occur periodically (e.g., every slot, every other slot, etc.), where base station 105-a can use the resources to transmit the downlink data without having to configure the resources for each transmission (e.g., a single configuration may indicate multiple instances that are available for subsequent transmissions). In some implementations, base station 105-a may activate and deactivate the group-common SPS downlink shared channels as needed (e.g., activate when a sufficient amount of downlink data is to be transmitted to the UEs 115).

As shown, base station 105-a may communicate with UE 115-a on resources of a carrier 205-a, with UE 115-b on resources of a carrier 205-b, and with UE 115-c on resources of a carrier 205-c. For example, base station 105-a may transmit multicast messages and data to each UE 115 on a corresponding carrier 205. Before transmitting the multicast messages and data to the UEs 115, base station 105-a may first transmit a configuration 210 to each UE 115 (e.g., in a PDCCH scheduling PDSCHs for the multicast messages and data). In some implementations, the configuration 210 may indicate a number of repeated group-common downlink shared channels 215 including two or more repetitions of a group-common downlink shared channel 220.

In some implementations, base station 105-a may transmit the repeated group-common downlink shared channels 215 according to a semi-static repetition scheme. For example, base station 105-a may configure the repeated group-common downlink shared channels 215 (e.g., dynamic PDSCHs, SPS PDSCHs, etc.) with a group aggregation factor (e.g., pdsch-AggregationFactor_group) by RRC signalling (e.g., different value than that of unicast dynamic/SPS PDSCH) to indicate the number of repetitions for the repeated group-common downlink shared channels 215. In some implementations, the group aggregation factor may be configured independently for the different types than the repeated group-common downlink shared channels 215. For example, a first group aggregation factor may be configured for the group-common dynamic downlink shared channels, and a second group aggregation factor may be configured for the group-common SPS downlink shared channels. Additionally or alternatively, a same group aggregation factor may be configured for both types of group-common downlink shared channels.

A default value of the group aggregation factor for a group-common dynamic downlink shared channel may be defined similar to that of a unicast dynamic downlink shared channel (in this case, the UEs monitoring the same group-common dynamic PDSCH are configured with a same unicast dynamic downlink shared channel) or may be predefined as one (1) (e.g., one (1) instance of a group-common dynamic downlink shared channel is transmitted unless otherwise configured with a number of repetitions). Additionally or alternatively, a default value of the group aggregation factor for a group-common SPS downlink shared channel may be defined similar to that of a group-common dynamic downlink shared channel with a G-RNTI associated with the G-CS-RNTI (e.g., corresponding to same service), or similar to that of a unicast dynamic downlink shared channel, or predefined as one (1).

Additionally or alternatively, base station 105-a may transmit the repeated group-common downlink shared channels 215 according to a dynamic repetition scheme. For example, base station 105-a may configure the repeated group-common downlink shared channels 215 (e.g., dynamic PDSCHs, SPS PDSCHs, etc.) with a time domain allocation list (e.g., pdsch-TimeDomainAllocationList) containing a dynamic group repetition number (e.g., RepNum_group) to indicate the number of repetitions for the repeated group-common downlink shared channels 215. In some implementations, a TDRA field in a downlink control information (DCI) format scheduling the group-common downlink shared channels 220 or for activating the group-common downlink shared channels 220 (e.g., for SPS downlink shared channels) may indicate one entry of the time domain allocation list for the repeated group-common downlink shared channels 215. Similar to the semi-static repetition scheme, base station 105-a may configure the dynamic group repetition number independently or jointly for the different types of group-common downlink shared channels.

For selection between the semi-static repetition scheme and the dynamic repetition scheme, a UE 115 may not be configured with both the semi-static repetition scheme and the dynamic repetition scheme for the repeated group-common downlink shared channels 215 that have a same G-RNTI, same G-CS-RNTI, or the associated pair of G-RNTI and G-CS-RNTI configured to the same group of UEs to receive a same service. Additionally or alternatively, base station 105-a may configure the semi-static repetition schemes and the dynamic repetition schemes independently for the group-common downlink shared channels 215 based on different G-RNTIs or G-CS-RNTIs.

In some implementations, a gap may occur between each repetition of the repeated group-common downlink shared channels 215. As such, rather than having each repetition for the repeated group-common downlink shared channels 215 occur in consecutive slots, base station 105-a may configure the repetitions to occur with one or more slots in between each repetition. The techniques for configuring the gaps between slots is described in more detail with reference to FIG. 3B.

Additionally, after monitoring for and receiving the repeated group-common downlink shared channels 215, the UEs 115 may transmit an acknowledgment feedback 225 based on successfully receiving and decoding the group-common downlink shared channel 220 or not using the repeated group-common downlink shared channels 215 (e.g., combining the repetitions). For example, the acknowledgment feedback 225 may include HARQ-ACK feedback, such as a positive acknowledgment (ACK) message to indicate a successful reception and decoding of the group-common downlink shared channel 220 or a negative acknowledgment (NACK) message to indicate an unsuccessful reception or decoding of the group-common downlink shared channel 220. The techniques for determining the acknowledgment feedback 225 based on the repeated group-common downlink shared channels 215 is described in more detail with reference to FIG. 4B.

Figure 3A:
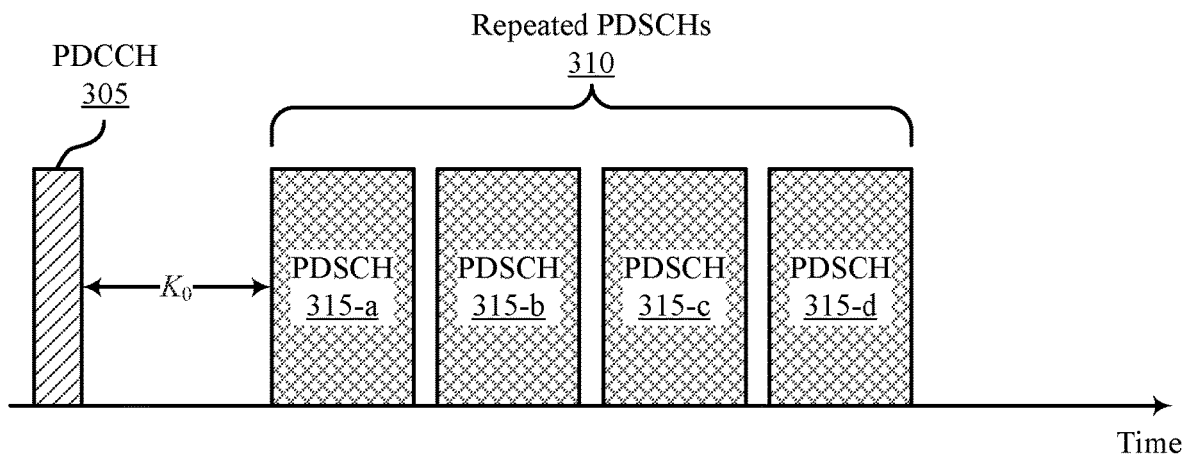
FIGS. 3A and 3B illustrate examples of repetition schemes that support configurations for group-common downlink channels with repetitions in accordance with aspects of the present disclosure.
Figure 3B:
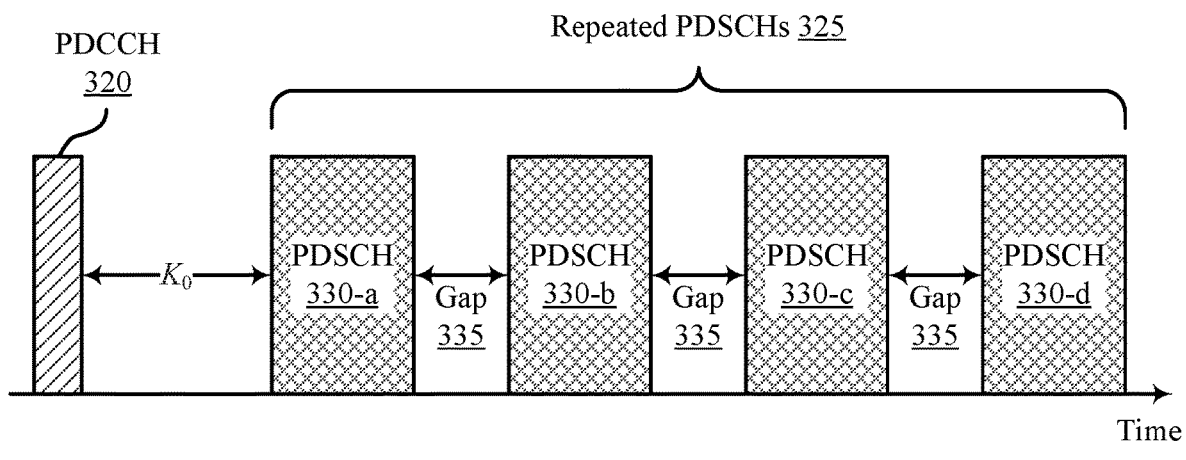

FIGS. 3A and 3B illustrate examples of repetition schemes 300 and 301 that support configurations for group-common downlink channels with repetitions in accordance with aspects of the present disclosure. Repetition schemes 300 and 301 may implement aspects of wireless communications systems 100 and 200. For example, a base station 105 may use repetition schemes 300 and 301 when transmitting a downlink shared channel to one or more UEs 115. Repetition scheme 300 may represent a unicast downlink shared channel transmitted by the base station 105 to a single UE using repetitions of the unicast downlink shared channel. Repetition scheme 301 may represent a group-common downlink shared channel transmitted by the base station 105 to multiple UEs 115 using repetitions of the group-common downlink shared channel.

As previously noted, repetition scheme 300 may illustrate a unicast PDSCH 315 with repetition in consecutive slots. For example, the base station 105 may transmit a PDCCH 305 scheduling repeated PDSCHs 310 for a UE 115 to monitor for and receive (e.g., via a configuration for the PDSCHs). The PDCCH 305 may also indicate the number of repetitions with which the unicast PDSCH 315 is transmitted (e.g., via pdsch-AggregationFactor or RepNumR16 as described with reference to FIG. 1). For example, the PDCCH 305 may indicate four (4) repetitions of the unicast PDSCH 315 for the repeated PDSCHs 310, such as a first unicast PDSCH 315-a (e.g., a first repetition), a second unicast PDSCH 315-b (e.g., a second repetition), a third unicast PDSCH 315-c (e.g., a third repetition), and a fourth unicast PDSCH 315-d (e.g., a fourth repetition). Additionally, in some cases, the PDCCH 305 may include an indication of a slot offset ($K_0$) that represents a number of slots (e.g., or different length transmission time intervals) between the end of the PDCCH 305 and the first unicast PDSCH 315-a.

Similarly, repetition scheme 301 may include a PDCCH 320 transmitted by a base station 105, where the PDCCH 320 schedules a set of repeated PDSCHs 325. The set of repeated PDSCHs 325 may include repetitions of a PDSCH 330 (e.g., as indicated via the group aggregation factor, pdsch-AggregationFactor_group, or the group repetition number, RepNum_group, as described with reference to FIG. 2), such as a first PDSCH 330-a (e.g., a first repetition), a second PDSCH 330-b (e.g., a second repetition), a third PDSCH 330-c (e.g., a third repetition), and a fourth PDSCH 330-d (e.g., a fourth repetition). Additionally, the PDCCH 320 may also include an indication of the slot offset, $K_0$. However, rather than being a unicast PDSCH as described with reference to FIG. 3A, the PDSCHs 330 may be group-common PDSCHs (e.g., group-common downlink shared channels) transmitted to multiple UEs 115.

Additionally, repetition scheme 301 may include a gap configuration for the group-common PDSCH repetition. For example, a gap 335 may occur between each repetition of the group-common PDSCH 330. For slot-level repetitions, the gap 335 (e.g., a number of gap slots) with a gap value greater than or equal to zero (0) (e.g., gap 335≥0) may be configured between group-common PDSCH repetitions. If the gap is equal to zero (0), the repetitions of the PDSCH 330 may be consecutive (e.g., no slots occur between the repetitions). The gap 335 may include absolute time slot(s) in terms of numerology of a BWP for the group-common PDSCH 330 (e.g., including downlink/uplink slots). Additionally, the gap 335 may be independent for group-common dynamic PDSCHs and per group-common SPS PDSCH.

In some implementations, the base station 105 may configure the values of the gap 335 semi-statically (e.g., via RRC signaling) or dynamically (e.g., by indicating a TDRA entry that has a gap value included). For a group-common SPS PDSCH, the total number of repetitions including gap slots may not exceed the periodicity in each SPS PDSCH configuration. For example, each group-common SPS PDSCH (may be associated with different G-CS-RNTI) may have independent configurations for periodicity, repetitions, and gaps. Accordingly, the repetitions plus the gap 335 may be smaller than the periodicity configured for the associated group-common SPS PDSCH. In some implementations, a UE 115 may not expect to receive an additional PDCCH to schedule another group-common PDSCH with a same G-RNTI and a same HARQ process ID during the gap 335 (e.g., during the gap slot(s)).

Figure 4A:
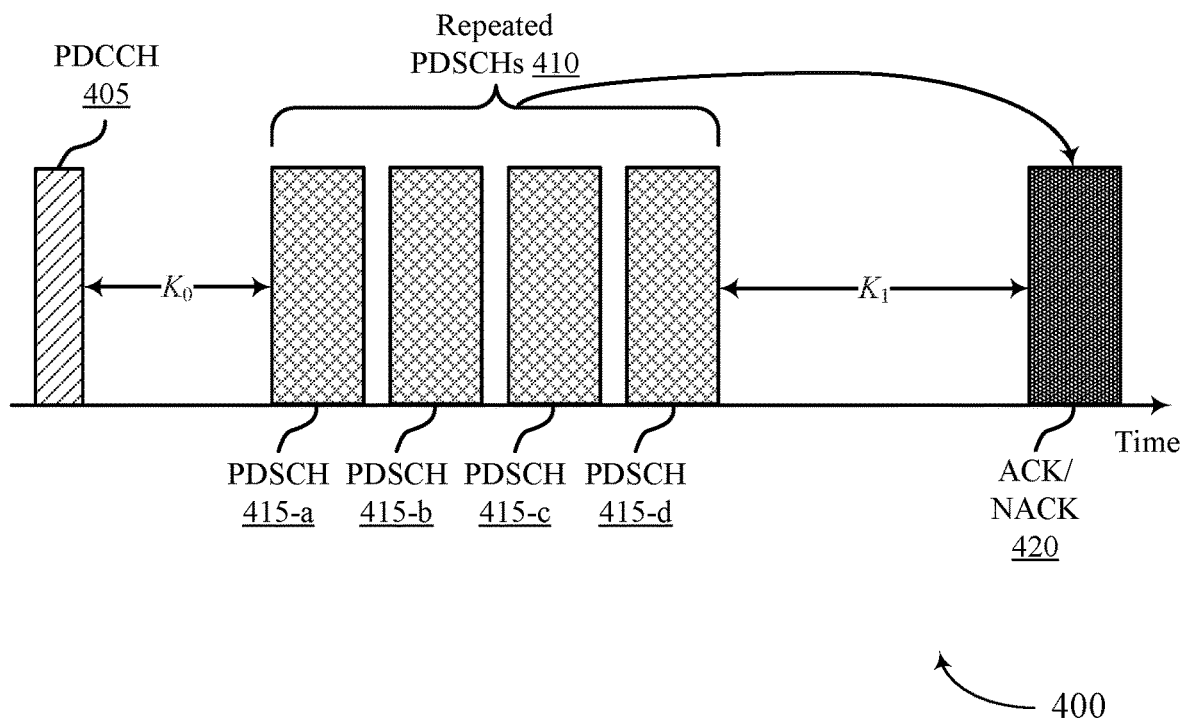
FIGS. 4A and 4B illustrate examples of acknowledgment feedback that support configurations for group-common downlink channels with repetitions in accordance with aspects of the present disclosure.
Figure 4B:
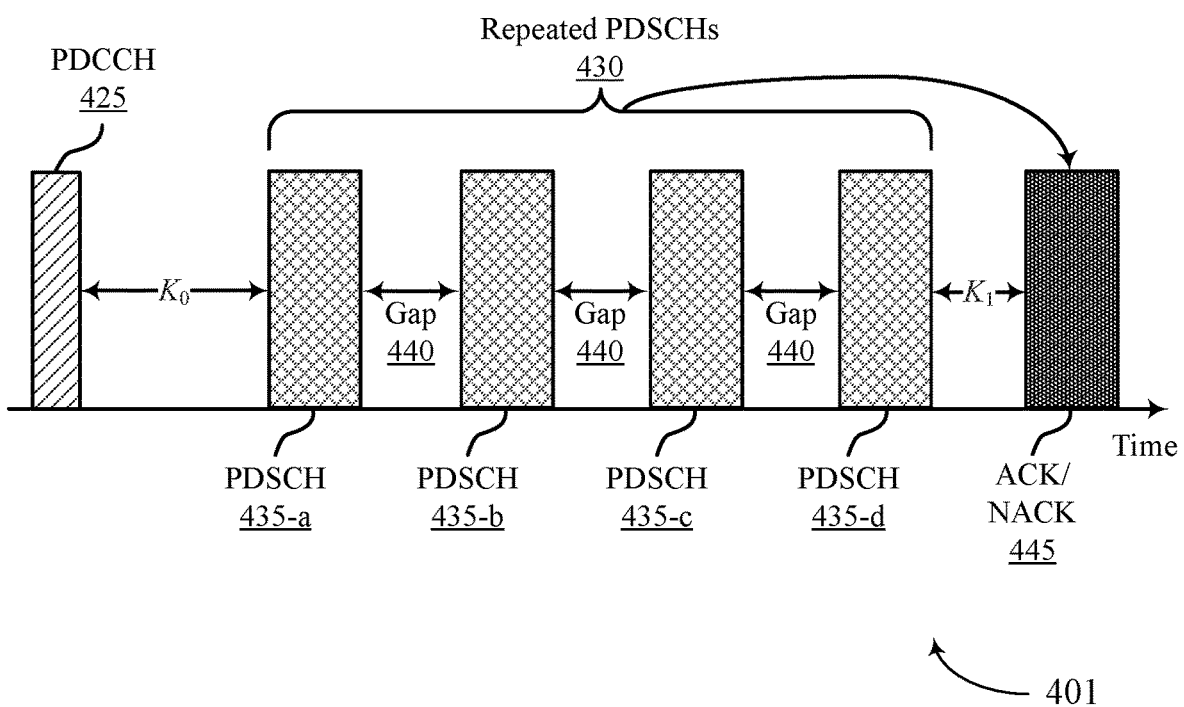

FIGS. 4A and 4B illustrate examples of acknowledgment feedback 400 and 401 that support configurations for group-common downlink channels with repetitions in accordance with aspects of the present disclosure. Acknowledgment feedback 400 and 401 may implement aspects of wireless communications systems 100 and 200. For example, a UE 115 may use acknowledgment feedback 400 or 401 to transmit an acknowledgment message to a base station indicating whether a downlink shared channel with repetitions was successfully received and decoded or not.

Acknowledgment feedback 400 may represent a unicast PDSCH repetition configuration, where a PDCCH 405 schedules a set of repeated PDSCHs 410 including a first unicast PDSCH 415-a (e.g., a first repetition), a second unicast PDSCH 415-b (e.g., a second repetition), a third unicast PDSCH 415-c (e.g., a third repetition), and a fourth unicast PDSCH 415-d (e.g., a fourth repetition). In some implementations, the PDCCH 405 may include an indication of a slot offset ($K_0$) that represents a number of slots (e.g., or different length transmission time intervals) between the end of the PDCCH 405 and the first unicast PDSCH 415-a. Additionally, the PDCCH 405 may include an indication of a feedback indicator field value (e.g., PDSCH-to-HARQ-feedback timing indicator field value), $K_1$, that represents a number of slots (e.g., or different length transmission time intervals) between a last occurring PDSCH (e.g., the fourth unicast PDSCH 415-d) and an uplink channel (e.g., physical uplink control channel (PUCCH)) that carries an ACK/NACK 420 (e.g., acknowledgment feedback message). The ACK/NACK 420 may include an indication of whether the UE 115 successfully received and decoded the PDSCH 415 or not using the set of repeated PDSCHs 410.

When transmitting the ACK/NACK 420 (e.g., for PDSCH with repetitions), the UE 115 may use a HARQ-ACK codebook. For example, for a Type 1 HARQ-ACK codebook, the UE 115 may provide a single HARQ-ACK feedback for a set of $M_{A,c}$ occasions of candidate PDSCH repetitions, where a timeline is counted at the end of slot repetitions. For a semi-static repetition scheme, the set of $M_{A,c}$ occasions for candidate PDSCH receptions may be determined based on maximum values of aggregation factor (e.g., pdsch-AggregationFactor) values (e.g., if provided in sps-Config and/or pdsch-Config). For a dynamic repetition scheme, $N_{PDSCH}^{repeat,max}=1$ and a last PDSCH reception may be determined based on an indicated repetition number (e.g., RepNumR16). That is, if the UE 115 is provided the aggregation factor (e.g., pdsch-AggregationFactor) in a configuration message for a corresponding PDSCH (e.g., SPS-Config or PDSCH-Config) and there is not an entry in a time domain allocation list (e.g., pdsch-TimeDomainAllocation-List) that includes a repetition number (e.g., RepNumR16) in the time domain allocation list (e.g., PDSCH-TimeDomainResource Allocation), $N_{PDSCH}^{repeat,max}$ may be a maximum value of the aggregation factor (e.g., pdsch-AggregationFactor) in the corresponding configuration message for the PDSCH (e.g., in SPS-Config or PDSCH-Config); otherwise $N_{PDSCH}^{repeat,max}=1$.

Using the Type 1 HARQ-ACK codebook, the UE 115 may report HARQ-ACK information for a PDSCH reception from slot $n-N_{PDSCH}^{repeat}+1$ to slot n if $N_{PDSCH}^{repeat}$ is provided by the aggregation factor (e.g., pdsch-AggregationFactor), or from slot n−RepNumR16+1 to slot n if a time domain resource assignment field in a DCI format scheduling the PDSCH reception indicates an entry in the time domain allocation list (e.g., pdsch-TimeDomainAllocation-List) containing the repetition number (e.g., RepNumR16), or in slot n otherwise.

Additionally or alternatively, for transmitting ACK/NACK 420 using a Type 2 HARQ-ACK codebook, a HARQ-ACK bit for dynamic or SPS PDSCHs with repetition may correspond to the PDCCH monitoring occasions based on the feedback timing indicator field value ($K_1$) (e.g., PDSCH-to-HARQ_feedback timing indicator field values), the slot offsets ($K_0$), and PDSCH repetition number (e.g., pdsch-AggregationFactor or RepNumR16) when provided. That is, for a Type 2 HARQ-ACK codebook in an uplink control channel (e.g., PUCCH), a UE 115 may determine monitoring occasions for PDCCH with DCI format scheduling PDSCH receptions or SPS PDSCH release on an active DL BWP of a serving cell c and for which the UE transmits HARQ-ACK information in a same PUCCH in slot n based on $K_1$ (e.g., PDSCH-to-HARQ_feedback timing indicator field values) for PUCCH transmission with HARQ-ACK information in slot n in response to PDSCH receptions or SPS PDSCH release and on $K_0$ (slot offsets) provided by the time domain resource assignment field in a DCI format scheduling PDSCH receptions or SPS PDSCH release and by aggregation factor or repetition number (e.g., pdsch-AggregationFactor or RepNumR16) when provided.

Similarly, acknowledgment feedback 401 may include a PDCCH 425 transmitted by a base station 105, where the PDCCH 425 schedules a set of repeated PDSCHs 430. The set of repeated PDSCHs 430 may include repetitions of a PDSCH 435 (e.g., as indicated via the group aggregation factor, pdsch-AggregationFactor group, or the group repetition number, RepNum_group, as described with reference to FIG. 2), such as a first PDSCH 435-a (e.g., a first repetition), a second PDSCH 435-b (e.g., a second repetition), a third PDSCH 435-c (e.g., a third repetition), and a fourth PDSCH 435-d (e.g., a fourth repetition). Additionally, the PDCCH 425 may also include an indication of the slot offset, $K_0$, and the feedback timing indicator field value, $K_1$ (e.g., PDSCH-to-HARQ_feedback timing indicator field values). However, rather than being a unicast PDSCH as described with reference to FIG. 4A, the PDSCHs 435 may be group-common PDSCHs (e.g., group-common downlink shared channels) transmitted to multiple UEs 115.

Additionally, acknowledgment feedback 401 may include a gap 440 in between each repetition of the PDSCHs 435 (e.g., as described with reference to FIG. 3B). Based on the gap 440 and if the fourth PDSCH 435-d occurs in slot n, the first PDSCH 435-a may occur in a slot given by (n−3(1+ gap)), the second PDSCH 435-b may occur in a slot given by (n−2(gap+1)), and the third PDSCH 435-c may occur in a slot given by (n−(gap+1)). Subsequently, one of the multiple UEs 115 may transmit an ACK/NACK 445 to indicate whether the UE 115 successfully received and decoded the PDSCH 435 or not using the set of repeated PDSCHs 430 (e.g., after the $K_1$).

Additionally, the UE 115 may use a Type 1 HARQ-ACK codebook or a Type 2 HARQ-ACK codebook when transmitting the ACK/NACK 445 for the group-common set of repeated PDSCHs 430 (e.g., multicast data). For example, if the Type 1 HARQ-ACK codebook is configured for the group-common PDSCH 435 and if the group-common PDSCH 435 is configured with semi-static repetition (e.g., as described with reference to FIG. 2), the set of $M_{A,c}$ occasions for candidate PDSCH receptions may be determined from slot (n−$N_{PDSCH}^{repeat,max}$+1) to slot n with:

$N_{PDSCH}^{repeat,max}$=max{pdsch-AggregationFactor_ group+(pdsch-AggregationFactor_group−1) Gap}.

That is, $N_{PDSCH}^{repeat,max}$ may represent the maximum value of a group aggregation factor (e.g., pdsch-AggregationFactor) and the gap 440 in the configuration of a group-common dynamic PDSCH and a group-common SPS PDSCH with the associated G-RNTI and G-CS-RNTI (e.g., corresponding to same service) in a same BWP. Per gap occasion, the UE 115 may be configured to send a NACK, repeat an ACK/NACK based on the PDSCH reception, or nothing.

Additionally or alternatively, if the Type 1 HARQ-ACK codebook is configured for the group-common PDSCH 435 and if the group-common PDSCH 435 is configured with dynamic repetition (e.g., as described with reference to FIG. 2), the UE 115 may determine the PDSCH reception is from slot (n−$N_{PDSCH}^{repeat}$+1) to slot n, with:

$N_{PDSCH}^{repeat}$=RepNum$_{group}$+(RepNum$_{group}$−1)Gap.

In some cases, $N_{PDSCH}^{repeat,max}$=1. For example, the PDSCH repetition configured via the group aggregation factor (e.g., pdsch-AggregationFactor_group) may not be applied if a TDRA table for group-common PDSCH has a row containing a group repetition number (e.g., RepNum_ group).

Additionally or alternatively, if a Type 2 HARQ-ACK codebook is configured for the group-common PDSCH 435, the PDCCH monitoring occasions on an active downlink BWP of a serving cell may be determined by $K_1$ (e.g., PDSCH-to-HARQ_feedback timing indicator field values between the last repetition of the group-common PDSCH 435 and PUCCH carrying ACK/NACK 445), $K_0$ (e.g., slot offsets between PDCCH 425 and the first repetition of the group-common PDSCH 435), a repetition number for the group-common PDSCH (e.g., given by pdsch-Aggregation-Factor_group or RepNum_group), and the gap 440 (e.g., if configured). If the group-common PDSCH 435 is configured with the semi-static repetition scheme, the PDCCH monitoring occasions may be based on $K_1$, $K_0$, and (pdsch-AggregationFactor_group+(pdsch-AggregationFactor_ group−1)Gap). Alternatively, if the group-common PDSCH 435 is configured with the dynamic repetition scheme, the PDCCH monitoring occasions may be based on $K_1$, $K_0$, and (RepNum_group+(RepNum_group−1)Gap).

Figure 5:
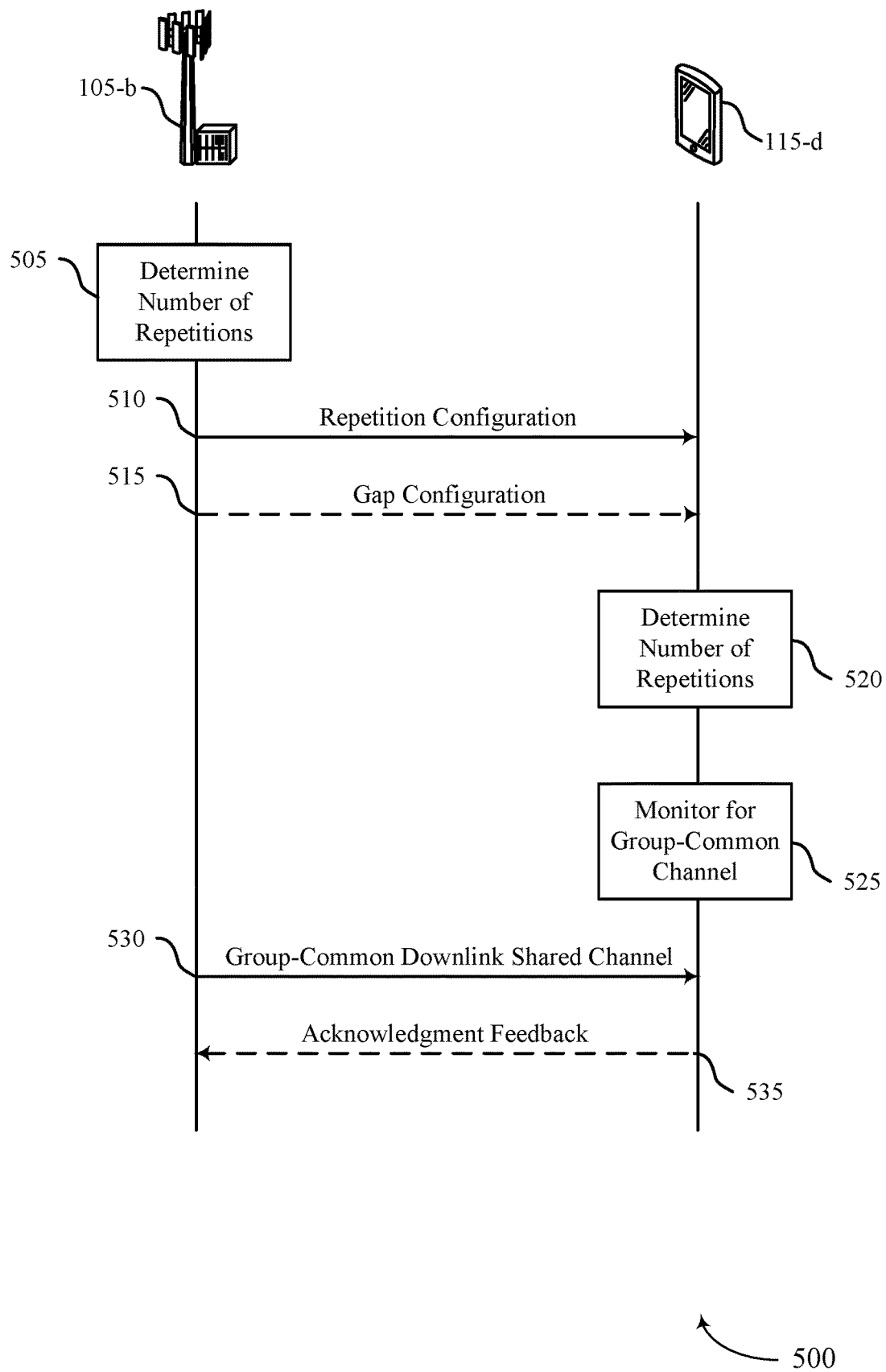
FIG. 5 illustrates an example of a process flow that supports configurations for group-common downlink channels with repetitions in accordance with aspects of the present disclosure.

FIG. 5 illustrates an example of a process flow 500 that supports configurations for group-common downlink channels with repetitions in accordance with aspects of the present disclosure. Process flow 500 may implement aspects of wireless communications systems 100 and 200. For example, process flow 500 may include a base station 105-b and a UE 115-d, which may represent examples of corresponding base stations 105 and UEs 115, respectively, as described with reference to FIGS. 1-4B.

In the following description of the process flow 500, the operations between base station 105-b and UE 115-d may be transmitted in a different order than the exemplary order shown, or the operations performed by base station 105-b and UE 115-d may be performed in different orders or at different times. Certain operations may also be left out of the process flow 500, or other operations may be added to the process flow 500. It is to be understood that while base station 105-b and UE 115-d are shown performing a number of the operations of process flow 500, any wireless device may perform the operations shown.

At 505, base station 105-b may determine a number of repetitions for a group-common downlink shared channel, the group-common downlink shared channel including one or more downlink shared channels (e.g., one or more dynamic downlink shared channels, dynamic PDSCHs, etc.), one or more semi-persistent downlink shared channels different from the one or more downlink shared channels, or a combination thereof.

At 510, UE 115-d may receive, from base station 105-b, a repetition configuration for a group-common downlink shared channel. In some implementations, the repetition configuration may include a group RNTI indicating the group-common downlink shared channel is transmitted for a set of UEs 115 that includes at least UE 115-d.

In some implementations, UE 115-d may receive, from base station 105-b, a semi-static repetition configuration for the repetition configuration. For example, the semi-static repetition configuration may include a group aggregation factor, where the number of repetitions is determined based on the group aggregation factor and on the group-common downlink shared channel. In some implementations, the group aggregation factor for the one or more group-common downlink shared channels or the one or more semi-persistent group-common downlink shared channels may be pre-defined as one. Additionally or alternatively, UE 115-d may determine the group aggregation factor for the one or more semi-persistent group-common downlink shared channels based on the group aggregation factor for the one or more group-common downlink shared channels, where the one or more group-common downlink shared channels include associated group RNTIs with the one or more semi-persistent group-common downlink shared channels. In some implementations, UE 115-*d* may determine the group aggregation factor for the one or more group-common downlink shared channels with a group RNTI based on an aggregation factor of a unicast downlink shared channel configured to UE 115-*d*.

Additionally or alternatively, UE 115-*d* may receive, from base station 105-*b*, a dynamic repetition configuration for the repetition configuration. In some implementations, the dynamic repetition configuration may include a group repetition number parameter via a TDRA indication, where the number of repetitions is determined based on the group repetition number parameter.

At 515, UE 115-*d* may receive, from base station 105-*b*, a gap configuration including an indication of a gap that occurs between repetitions of the group-common downlink shared channel. For example, UE 115-*d* may receive, from base station 105-*b*, the gap configuration semi-statically via RRC signaling, dynamically via a TDRA indication including a gap value for the gap, or a combination thereof. In some implementations, the gap may include a number of slots between each repetition of the group-common downlink shared channel, where a length of each slot is based on a configuration of a BWP used for carrying the group-common downlink shared channel. Additionally, the gap may be configured independently for the one or more downlink shared channels and for the one or more semi-persistent downlink shared channels. In some implementations, the number of repetitions combined with the gap between the repetitions may not exceed a periodicity configured for a semi-persistent downlink shared channel.

At 520, UE 115-*d* may determine the number of repetitions for the group-common downlink shared channel based on the repetition configuration.

At 525, UE 115-*d* may monitor for the group-common downlink shared channel from the base station based on the determined number of repetitions.

At 530, base station 105-*b* may transmit, to one or more UEs 115 including UE 115-*b*, the group-common downlink shared channel based on the determined number of repetitions.

At 535, UE 115-*d* may transmit, to base station 105-*b*, an acknowledgment feedback message for the group-common downlink shared channel based on the monitoring, where the acknowledgment feedback message indicates a successful or unsuccessful reception of the group-common downlink shared channel based on the number of repetitions. In some implementations, UE 115-*d* may receive, from base station 105-*b*, a configuration for a Type 1 acknowledgment codebook for transmitting the acknowledgment feedback message. Accordingly, UE 115-*d* may determine a set of occasions for the monitoring for the group-common downlink shared channel based on the number of repetitions and a gap value representing a gap between each repetition of the group-common downlink shared channel and may transmit, to base station 105-*b*, a single acknowledgment feedback message for the set of occasions based on the Type 1 acknowledgment codebook.

Additionally or alternatively, UE 115-*d* may receive, from base station 105-*b*, a configuration for a Type 2 acknowledgment codebook for transmitting the acknowledgment feedback message. Accordingly, UE 115-*d* may determine the set of occasions for the monitoring for the group-common downlink shared channel based on a feedback timing indicator field value between a last repetition of the group-common downlink shared channel and the acknowledgment feedback message (e.g., $K_1$), an offset value between a downlink control channel carrying the repetition configuration and a first repetition of the group-common downlink shared channel (e.g., $K_0$), the number of repetitions, a gap value representing a gap between each repetition of the group-common downlink shared channel, or a combination thereof. Subsequently, UE 115-*d* may transmit, to base station 105-*b*, the acknowledgment feedback message for the plurality of occasions based on the Type 2 acknowledgment codebook.

Figure 6:
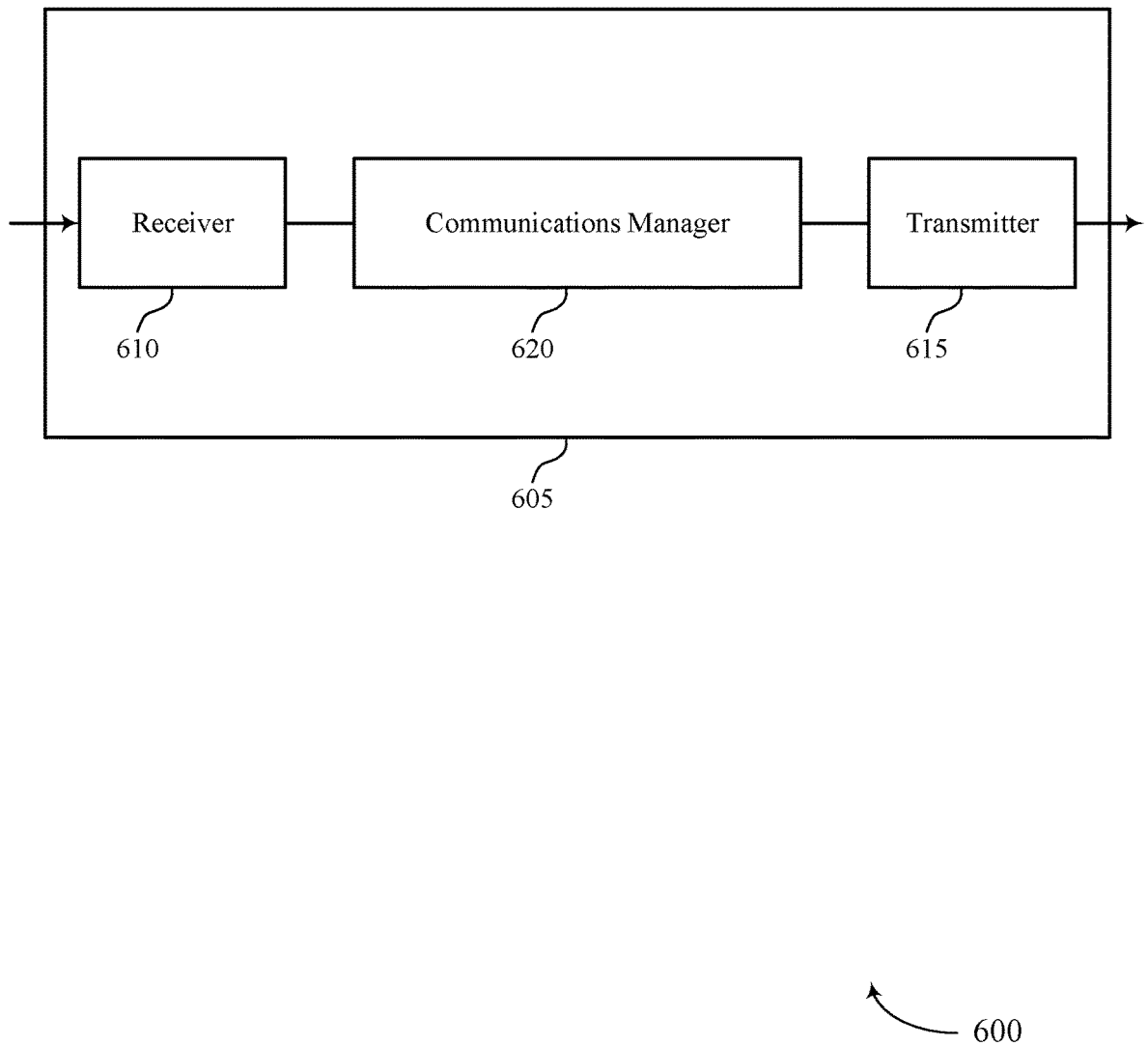
FIGS. 6 and 7 show block diagrams of devices that support configurations for group-common downlink channels with repetitions in accordance with aspects of the present disclosure.

FIG. 6 shows a block diagram 600 of a device 605 that supports configurations for group-common downlink channels with repetitions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to configurations for group-common downlink channels with repetitions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to size-based neural network selection for autoencoder-based communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of configurations for group-common downlink channels with repetitions as described herein. For example, the communications manager 620, the receiver 610, the transmitter 615, or various combinations thereof or various components thereof may support a method for performing one or more of the functions described herein.

In some examples, the communications manager 620, the receiver 610, the transmitter 615, or various combinations thereof or components thereof, may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations thereof or components thereof, may be implemented in code (e.g., as communications management software or firmware) executed by a processor. If implemented in code executed by a processor, the functions of the communications manager 620, the receiver 610, the transmitter 615, or various combinations thereof or components thereof, may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, a repetition configuration for a group-common downlink shared channel, the group-common downlink shared channel including one or more downlink shared channels, one or more semi-persistent downlink shared channels different from the one or more downlink shared channels, or a combination thereof. The communications manager 620 may be configured as or otherwise support a means for determining a number of repetitions for the group-common downlink shared channel based on the repetition configuration. The communications manager 620 may be configured as or otherwise support a means for monitoring for the group-common downlink shared channel from the base station based on the determined number of repetitions.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for enhancing reliability for group-common messages. For example, the repetitions for group-common downlink shared channels may increase a likelihood that a UE 115 successfully receives and decodes the group-common downlink shared channel (e.g., through combining different repetitions of the group-common downlink shared channel).

Figure 7:
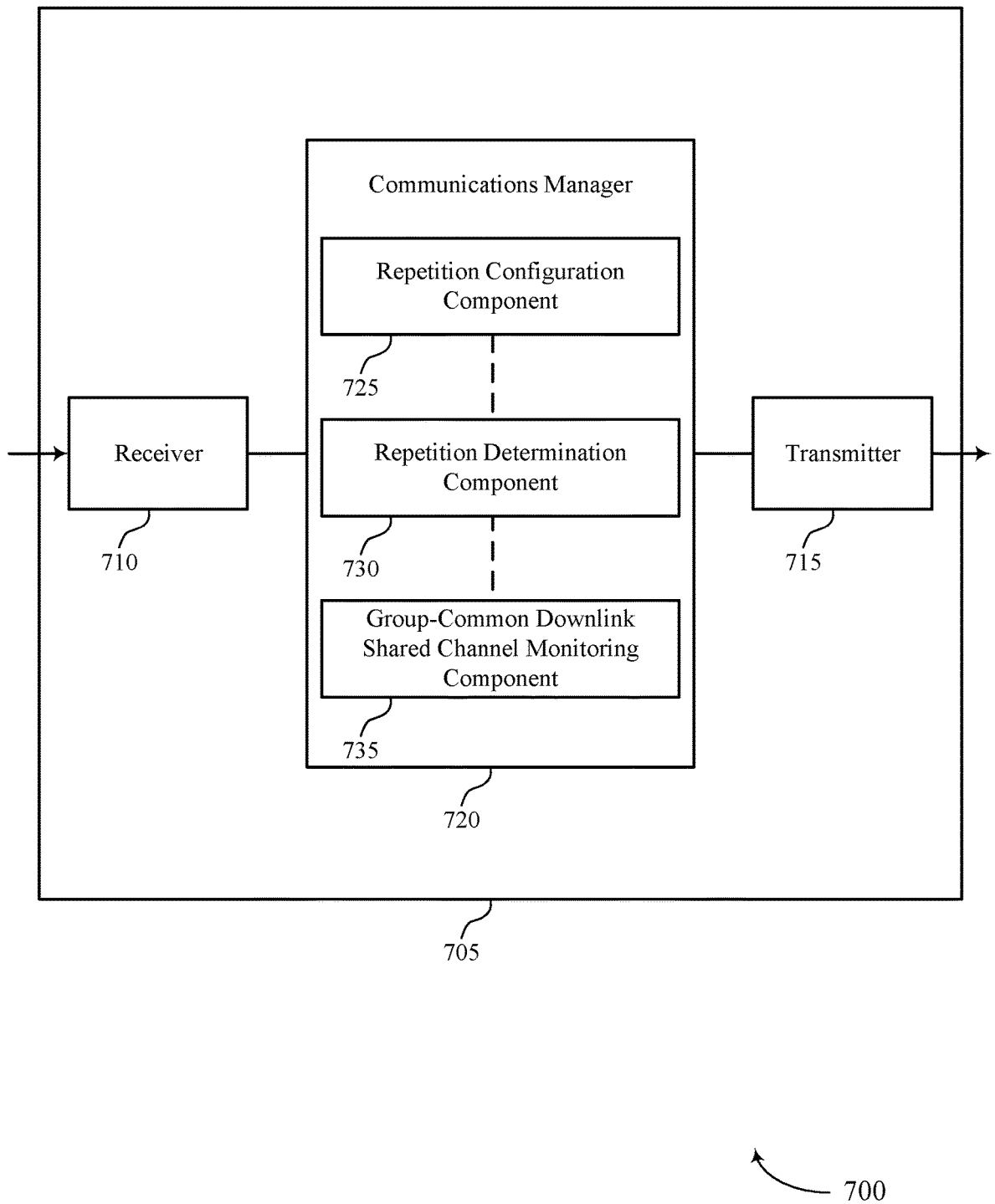

FIG. 7 shows a block diagram 700 of a device 705 that supports configurations for group-common downlink channels with repetitions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to configurations for group-common downlink channels with repetitions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to size-based neural network selection for autoencoder-based communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of configurations for group-common downlink channels with repetitions as described herein. For example, the communications manager 720 may include a repetition configuration component 725, a repetition determination component 730, a group-common downlink shared channel monitoring component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The repetition configuration component 725 may be configured as or otherwise support a means for receiving, from a base station, a repetition configuration for a group-common downlink shared channel, the group-common downlink shared channel including one or more downlink shared channels, one or more semi-persistent downlink shared channels different from the one or more downlink shared channels, or a combination thereof. The repetition determination component 730 may be configured as or otherwise support a means for determining a number of repetitions for the group-common downlink shared channel based on the repetition configuration. The group-common downlink shared channel monitoring component 735 may be configured as or otherwise support a means for monitoring for the group-common downlink shared channel from the base station based on the determined number of repetitions.

Figure 8:
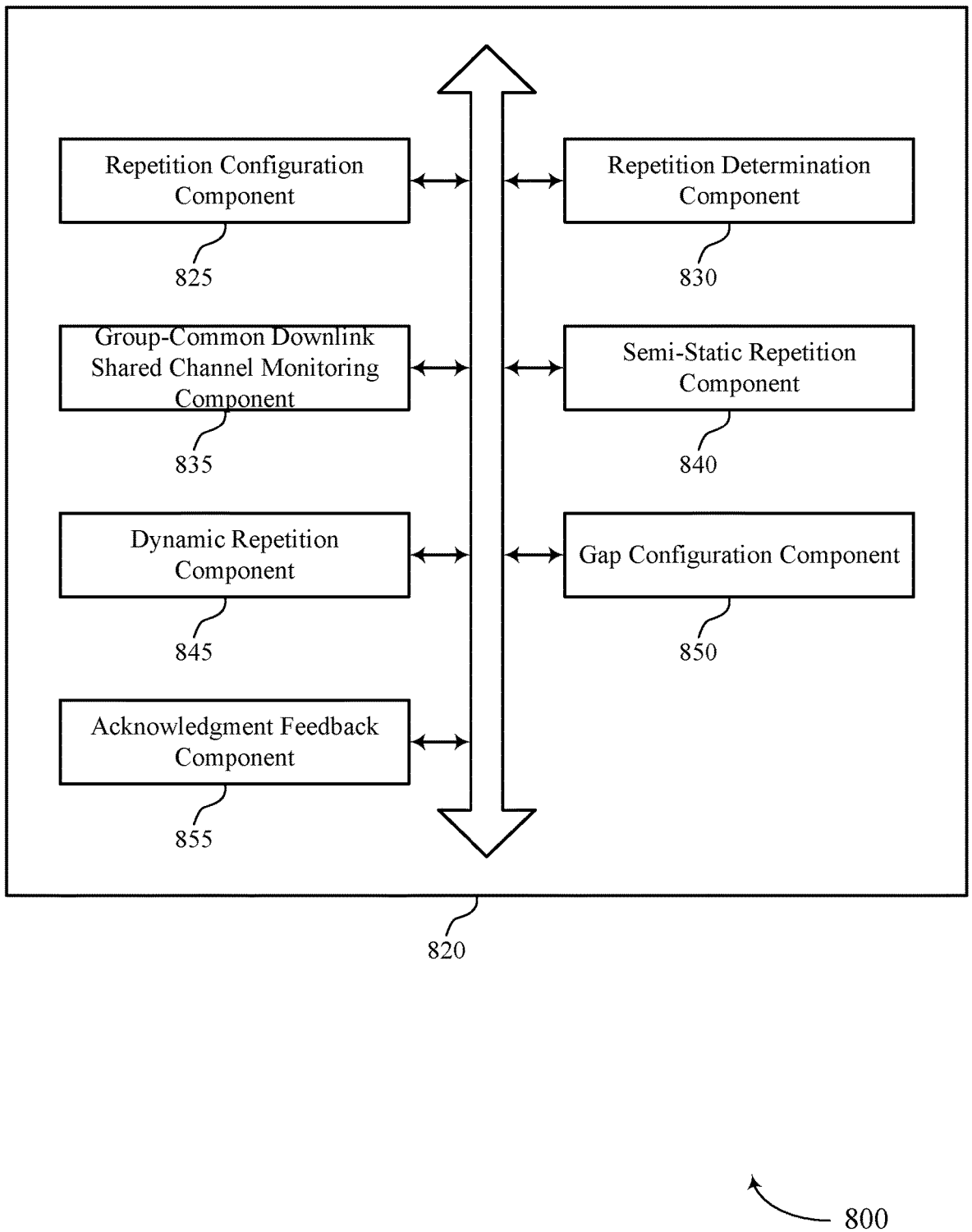
FIG. 8 shows a block diagram of a communications manager that supports configurations for group-common downlink channels with repetitions in accordance with aspects of the present disclosure.

FIG. 8 shows a block diagram 800 of a communications manager 820 that supports configurations for group-common downlink channels with repetitions in accordance with aspects of the present disclosure. The communications manager 820 may be an example of aspects of a communications manager 620, a communications manager 720, or both, as described herein. The communications manager 820, or various components thereof, may be an example of means for performing various aspects of configurations for group-common downlink channels with repetitions as described herein. For example, the communications manager 820 may include a repetition configuration component 825, a repetition determination component 830, a group-common downlink shared channel monitoring component 835, a semi-static repetition component 840, a dynamic repetition component 845, a gap configuration component 850, an acknowledgment feedback component 855, or any combination thereof. Each of these components may communicate, directly or indirectly, with one another (e.g., via one or more buses).

The communications manager 820 may support wireless communications at a UE in accordance with examples as disclosed herein. The repetition configuration component 825 may be configured as or otherwise support a means for receiving, from a base station, a repetition configuration for a group-common downlink shared channel, the group-common downlink shared channel including one or more downlink shared channels, one or more semi-persistent downlink shared channels different from the one or more downlink shared channels, or a combination thereof. The repetition determination component 830 may be configured as or otherwise support a means for determining a number of repetitions for the group-common downlink shared channel based on the repetition configuration. The group-common downlink shared channel monitoring component 835 may be configured as or otherwise support a means for monitoring for the group-common downlink shared channel from the base station based on the determined number of repetitions.

In some examples, to support receiving the group-common configuration for the downlink shared channel, the semi-static repetition component 840 may be configured as or otherwise support a means for receiving, from the base station, a semi-static repetition configuration for the repetition configuration.

In some examples, to support receiving the semi-static repetition configuration, the semi-static repetition component 840 may be configured as or otherwise support a means for receiving, from the base station, the semi-static repetition configuration via radio resource control signaling.

In some examples, the semi-static repetition component 840 may be configured as or otherwise support a means for the semi-static repetition configuration includes a group aggregation factor, where the number of repetitions is determined based on the group aggregation factor and on the group-common downlink shared channel.

In some examples, the semi-static repetition component 840 may be configured as or otherwise support a means for the group aggregation factor for the one or more group-common downlink shared channels or the one or more semi-persistent group-common downlink shared channels is predefined as one.

In some examples, the semi-static repetition component 840 may be configured as or otherwise support a means for determining the group aggregation factor for the one or more semi-persistent group-common downlink shared channels based on the group aggregation factor for the one or more group-common downlink shared channels, where the repetition configuration includes group radio network temporary identifiers associated with the one or more semi-persistent group-common downlink shared channels.

In some examples, the semi-static repetition component 840 may be configured as or otherwise support a means for determining the group aggregation factor for the one or more group-common downlink shared channels with a group radio network temporary identifier based on an aggregation factor of a unicast downlink shared channel configured to the UE.

In some examples, to support receiving the configuration for the downlink shared channel, the dynamic repetition component 845 may be configured as or otherwise support a means for receiving, from the base station, a dynamic repetition configuration for the repetition configuration.

In some examples, the dynamic repetition component 845 may be configured as or otherwise support a means for the dynamic repetition configuration includes a group repetition number parameter via a time-domain resource allocation indication, where the number of repetitions is determined based on the group repetition number parameter.

In some examples, the gap configuration component 850 may be configured as or otherwise support a means for receiving, from the base station, a gap configuration including an indication of a gap that occurs between repetitions of the group-common downlink shared channel.

In some examples, to support receiving the gap configuration, the gap configuration component 850 may be configured as or otherwise support a means for receiving, from the base station, the gap configuration semi-statically via radio resource control signaling, dynamically via a time domain resource allocation indication including a gap value for the gap, or a combination thereof.

In some examples, the gap configuration component 850 may be configured as or otherwise support a means for the gap includes a number of slots between each repetition of the group-common downlink shared channel, where a length of each slot is based on a configuration of a bandwidth part used for carrying the group-common downlink shared channel.

In some examples, the gap configuration component 850 may be configured as or otherwise support a means for the gap is configured independently for the one or more downlink shared channels and for the one or more semi-persistent downlink shared channels.

In some examples, the gap configuration component 850 may be configured as or otherwise support a means for the number of repetitions combined with the gap between the repetitions does not exceed a periodicity configured for a semi-persistent downlink shared channel.

In some examples, the acknowledgment feedback component 855 may be configured as or otherwise support a means for transmitting, to the base station, an acknowledgment feedback message for the group-common downlink shared channel based on the monitoring, where the acknowledgment feedback message indicates a successful or unsuccessful reception of the group-common downlink shared channel based on the number of repetitions.

In some examples, the acknowledgment feedback component 855 may be configured as or otherwise support a means for receiving, from the base station, a configuration for a Type 1 acknowledgment codebook for transmitting the acknowledgment feedback message.

In some examples, the acknowledgment feedback component 855 may be configured as or otherwise support a means for determining a set of multiple occasions for the monitoring for the group-common downlink shared channel based on the number of repetitions and a gap value representing a gap between each repetition of the group-common downlink shared channel. In some examples, the acknowledgment feedback component 855 may be configured as or otherwise support a means for transmitting, to the base station, a single acknowledgment feedback message for the set of multiple occasions based on the Type 1 acknowledgment codebook.

In some examples, the acknowledgment feedback component 855 may be configured as or otherwise support a means for receiving, from the base station, a configuration for a Type 2 acknowledgment codebook for transmitting the acknowledgment feedback message.

In some examples, the acknowledgment feedback component 855 may be configured as or otherwise support a means for determining a set of multiple occasions for the monitoring for the group-common downlink shared channel based on a feedback timing indicator field value between a last repetition of the group-common downlink shared channel and the acknowledgment feedback message, an offset value between a downlink control channel carrying the repetition configuration and a first repetition of the group-common downlink shared channel, the number of repetitions, a gap value representing a gap between each repetition of the group-common downlink shared channel, or a combination thereof. In some examples, the acknowledgment feedback component 855 may be configured as or otherwise support a means for transmitting, to the base station, the acknowledgment feedback message for the set of multiple occasions based on the Type 2 acknowledgment codebook.

In some examples, the repetition configuration component 825 may be configured as or otherwise support a means for the repetition configuration includes a group radio network temporary identifier indicating the group-common downlink shared channel is transmitted for a set of multiple UEs including at least the UE.

Figure 9:
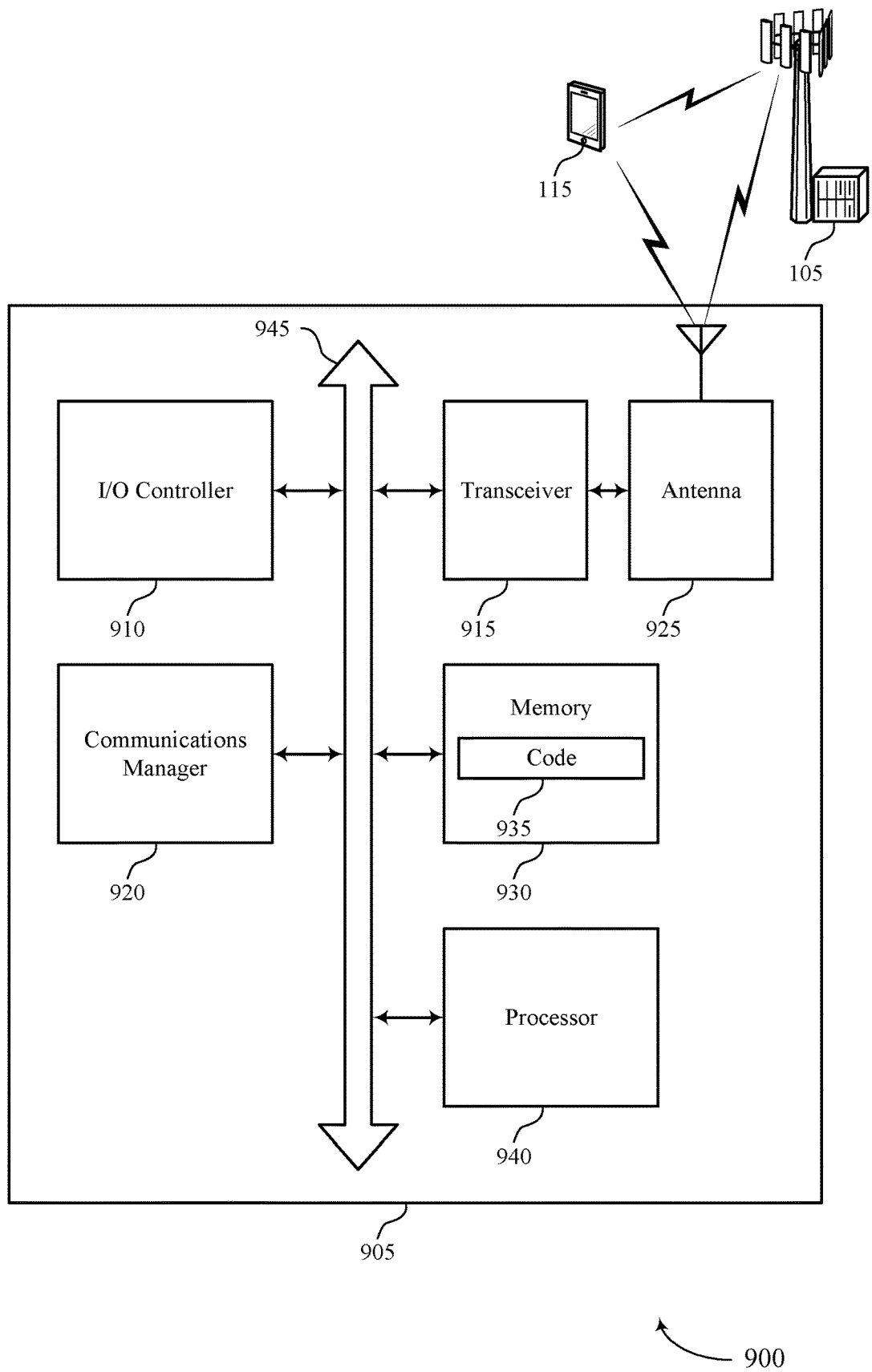
FIG. 9 shows a diagram of a system including a device that supports configurations for group-common downlink channels with repetitions in accordance with aspects of the present disclosure.

FIG. 9 shows a diagram of a system 900 including a device 905 that supports configurations for group-common downlink channels with repetitions in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, including a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In some other cases, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets and provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or other type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting configurations for group-common downlink channels with repetitions). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, a repetition configuration for a group-common downlink shared channel, the group-common downlink shared channel including one or more downlink shared channels, one or more semi-persistent downlink shared channels different from the one or more downlink shared channels, or a combination thereof. The communications manager 920 may be configured as or otherwise support a means for determining a number of repetitions for the group-common downlink shared channel based on the repetition configuration. The communications manager 920 may be configured as or otherwise support a means for monitoring for the group-common downlink shared channel from the base station based on the determined number of repetitions.

By including or configuring the communications manager 920 in accordance with examples as described herein, the device 905 may support techniques for improved communication reliability and improved coordination between devices. For example, the number of repetitions for the group-common downlink shared channel may increase the reliability that a processor of the device 905 is able to fully receive the group-common downlink shared channel. Additionally, the repetition configuration from the base station may enable the processor to determine how to monitor for and receive the group-common downlink shared channel.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of configurations for group-common downlink channels with repetitions as described herein, or the processor 940 and the memory 930 may be otherwise configured to perform or support such operations.

Figure 10:
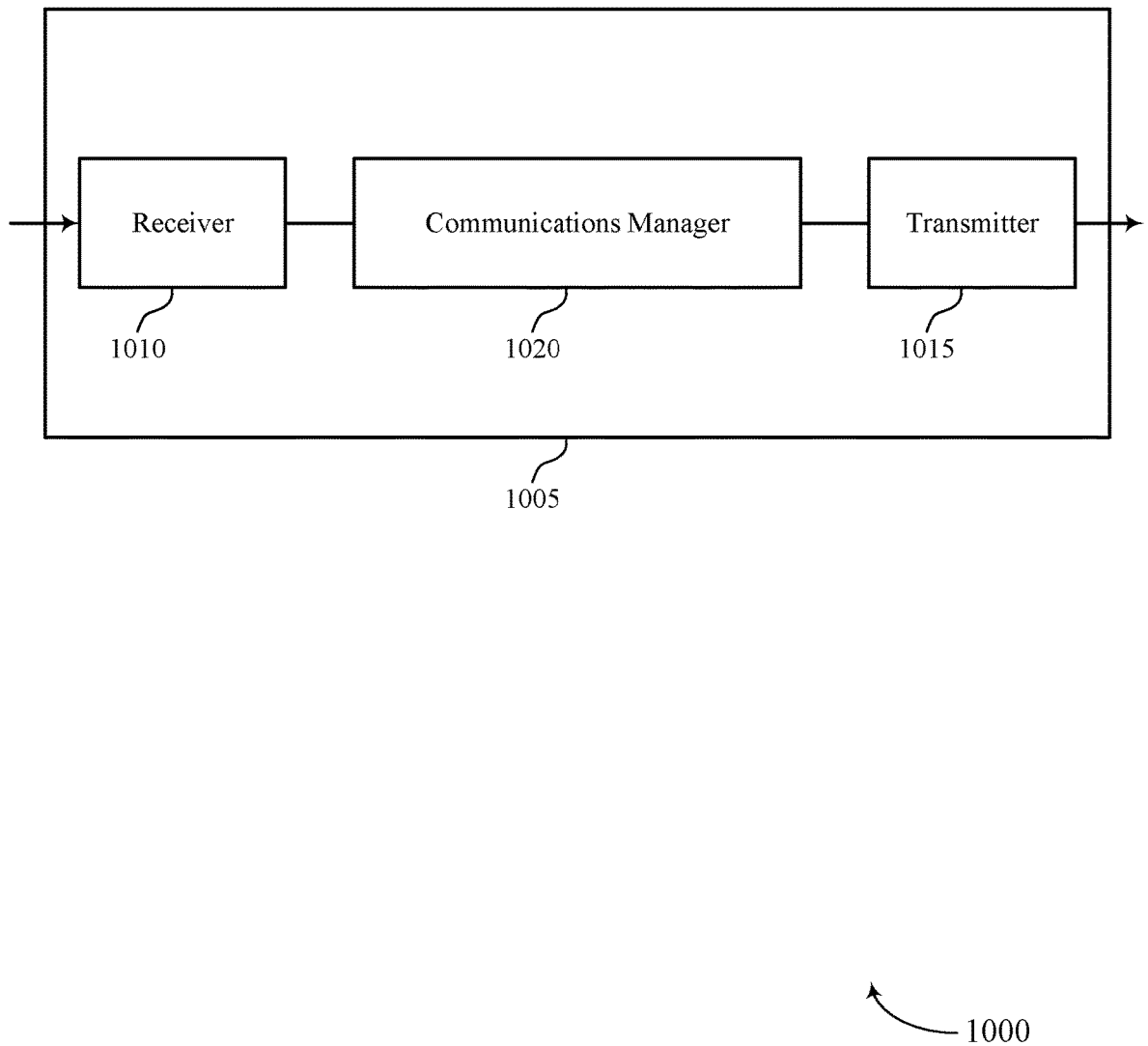
FIGS. 10 and 11 show block diagrams of devices that support configurations for group-common downlink channels with repetitions in accordance with aspects of the present disclosure.

FIG. 10 shows a block diagram 1000 of a device 1005 that supports configurations for group-common downlink channels with repetitions in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to configurations for group-common downlink channels with repetitions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to size-based neural network selection for autoencoder-based communication). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of configurations for group-common downlink channels with repetitions as described herein. For example, the communications manager 1020, the receiver 1010, the transmitter 1015, or various combinations thereof or various components thereof may support a method for performing one or more of the functions described herein.

In some examples, the communications manager 1020, the receiver 1010, the transmitter 1015, or various combinations thereof or components thereof, may be implemented in hardware (e.g., in communications management circuitry). The hardware may include a processor, an DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations thereof or components thereof, may be implemented in code (e.g., as communications management software or firmware) executed by a processor. If implemented in code executed by a processor, the functions of the communications manager 1020, the receiver 1010, the transmitter 1015, or various combinations thereof or components thereof, may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for determining a number of repetitions for a group-common downlink shared channel, the group-common downlink shared channel including one or more downlink shared channels, one or more semi-persistent downlink shared channels different from the one or more downlink shared channels, or a combination thereof. The communications manager 1020 may be configured as or otherwise support a means for transmitting, to one or more user equipment (UEs), a repetition configuration for the group-common downlink shared channel, the repetition configuration including an indication for the determined number of repetitions. The communications manager 1020 may be configured as or otherwise support a means for transmitting, to the one or more UEs, the group-common downlink shared channel based on the determined number of repetitions.

Figure 11:
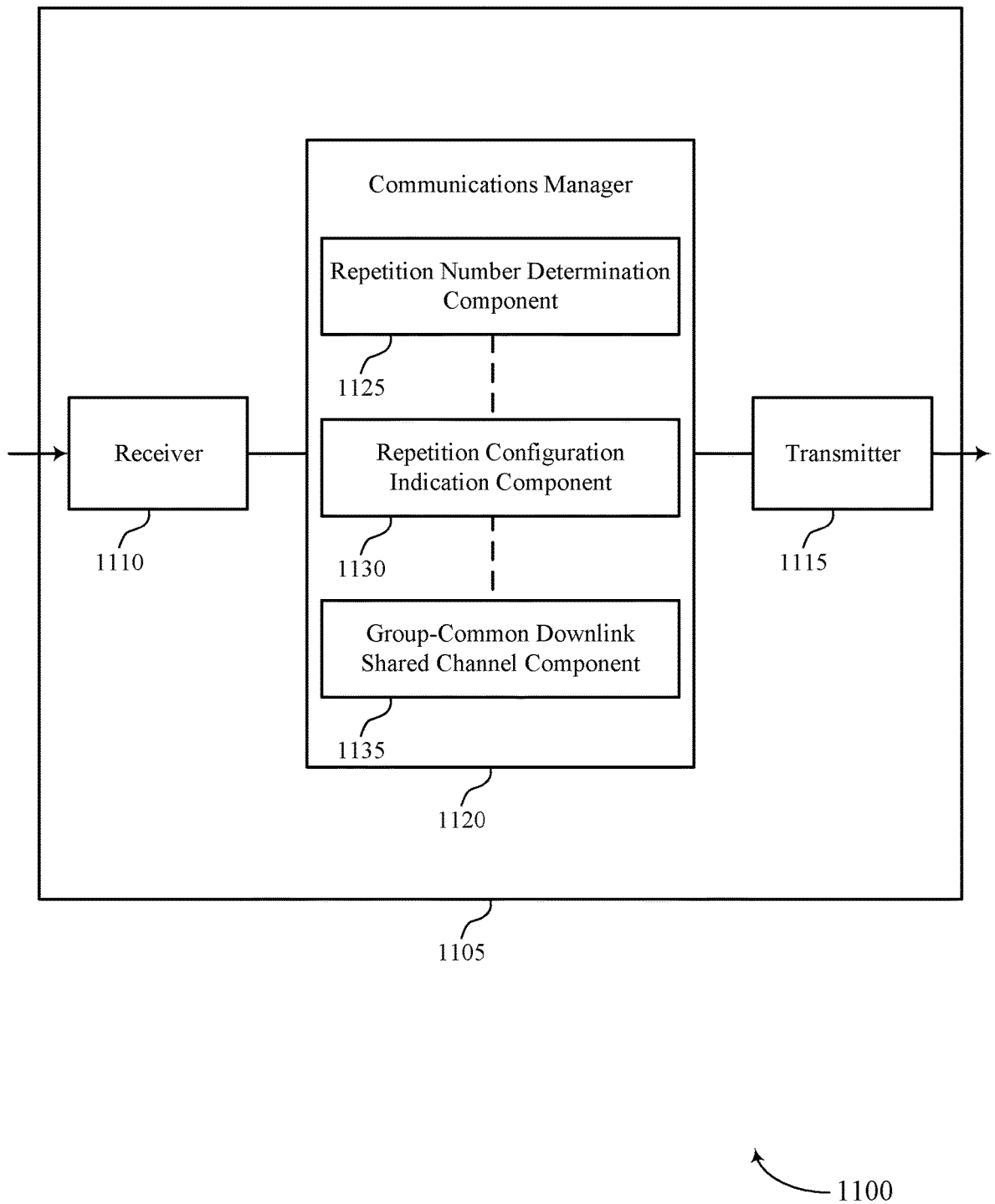

FIG. 11 shows a block diagram 1100 of a device 1105 that supports configurations for group-common downlink channels with repetitions in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to configurations for group-common downlink channels with repetitions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to size-based neural network selection for autoencoder-based communication). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of configurations for group-common downlink channels with repetitions as described herein. For example, the communications manager 1120 may include a repetition number determination component 1125, a repetition configuration indication component 1130, a group-common downlink shared channel component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The repetition number determination component 1125 may be configured as or otherwise support a means for determining a number of repetitions for a group-common downlink shared channel, the group-common downlink shared channel including one or more downlink shared channels, one or more semi-persistent downlink shared channels different from the one or more downlink shared channels, or a combination thereof. The repetition configuration indication component 1130 may be configured as or otherwise support a means for transmitting, to one or more user equipment (UEs), a repetition configuration for the group-common downlink shared channel, the repetition configuration including an indication for the determined number of repetitions. The group-common downlink shared channel component 1135 may be configured as or otherwise support a means for transmitting, to the one or more UEs, the group-common downlink shared channel based on the determined number of repetitions.

Figure 12:
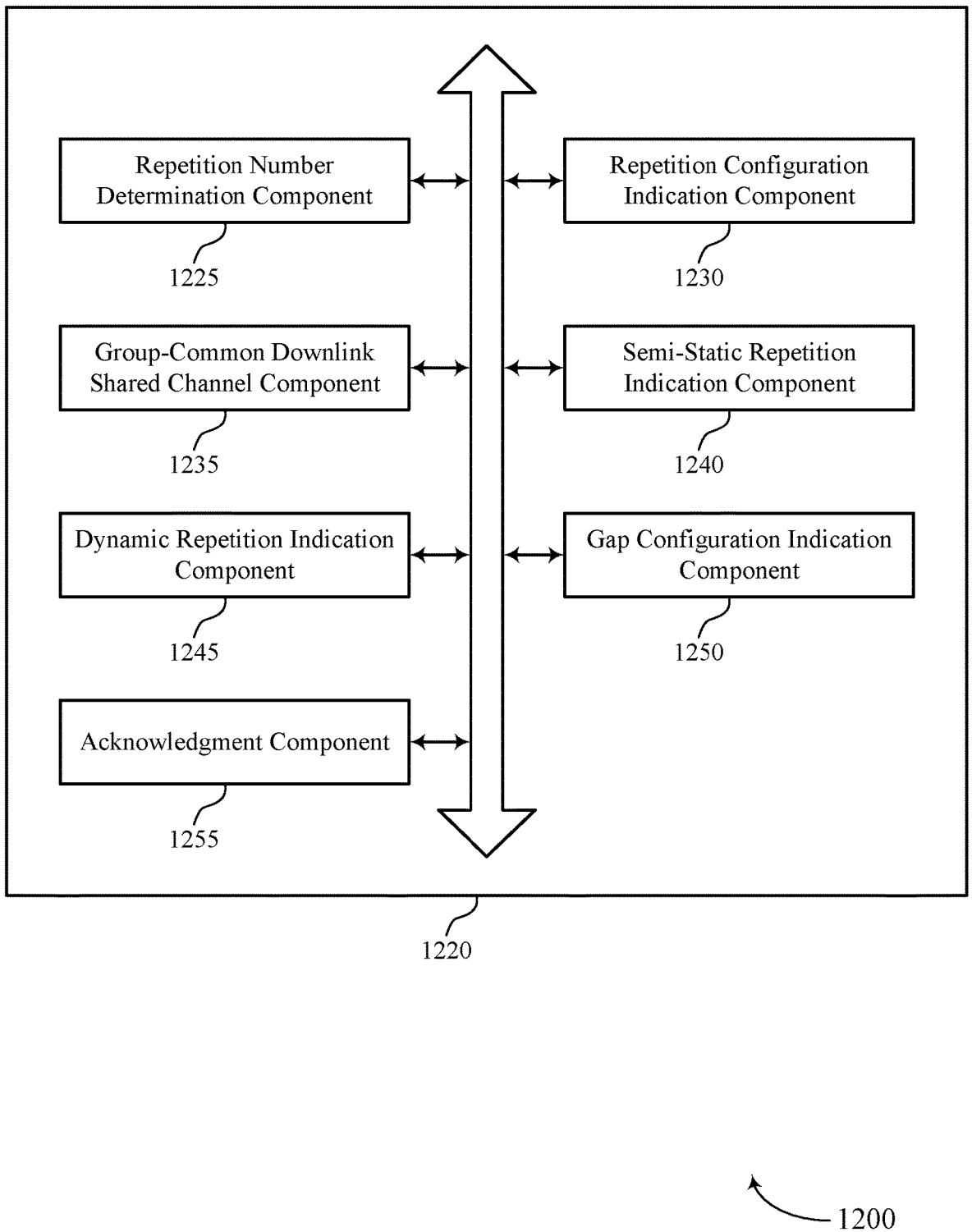
FIG. 12 shows a block diagram of a communications manager that supports configurations for group-common downlink channels with repetitions in accordance with aspects of the present disclosure.

FIG. 12 shows a block diagram 1200 of a communications manager 1220 that supports configurations for group-common downlink channels with repetitions in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of configurations for group-common downlink channels with repetitions as described herein. For example, the communications manager 1220 may include a repetition number determination component 1225, a repetition configuration indication component 1230, a group-common downlink shared channel component 1235, a semi-static repetition indication component 1240, a dynamic repetition indication component 1245, a gap configuration indication component 1250, an acknowledgment component 1255, or any combination thereof. Each of these components may communicate, directly or indirectly, with one another (e.g., via one or more buses).

The communications manager 1220 may support wireless communications at a base station in accordance with examples as disclosed herein. The repetition number determination component 1225 may be configured as or otherwise support a means for determining a number of repetitions for a group-common downlink shared channel, the group-common downlink shared channel including one or more downlink shared channels, one or more semi-persistent downlink shared channels different from the one or more downlink shared channels, or a combination thereof. The repetition configuration indication component 1230 may be configured as or otherwise support a means for transmitting, to one or more user equipment (UEs), a repetition configuration for the group-common downlink shared channel, the repetition configuration including an indication for the determined number of repetitions. The group-common downlink shared channel component 1235 may be configured as or otherwise support a means for transmitting, to the one or more UEs, the group-common downlink shared channel based on the determined number of repetitions.

In some examples, to support transmitting the group-common configuration for the downlink shared channel, the semi-static repetition indication component 1240 may be configured as or otherwise support a means for transmitting, to the one or more UEs, a semi-static repetition configuration for the repetition configuration.

In some examples, to support transmitting the semi-static repetition configuration, the semi-static repetition indication component 1240 may be configured as or otherwise support a means for transmitting, to the one or more UEs, the semi-static repetition configuration via radio resource control signaling.

In some examples, the semi-static repetition indication component 1240 may be configured as or otherwise support a means for the semi-static repetition configuration includes a group aggregation factor, where the number of repetitions is indicated based on the group aggregation factor and on the group-common downlink shared channel.

In some examples, to support transmitting the configuration for the downlink shared channel, the dynamic repetition indication component 1245 may be configured as or otherwise support a means for transmitting, to the one or more UEs, a dynamic repetition configuration for the repetition configuration.

In some examples, the dynamic repetition indication component 1245 may be configured as or otherwise support a means for the dynamic repetition configuration includes a group repetition number parameter via a time-domain resource allocation indication, where the number of repetitions is indicated based on the group repetition number parameter.

In some examples, the gap configuration indication component 1250 may be configured as or otherwise support a means for transmitting, to the one or more UEs, a gap configuration including an indication of a gap that occurs between repetitions of the group-common downlink shared channel.

In some examples, to support transmitting the gap configuration, the gap configuration indication component 1250 may be configured as or otherwise support a means for transmitting, to the one or more UEs, the gap configuration semi-statically via radio resource control signaling, dynamically via a time domain resource allocation indication including a gap value for the gap, or a combination thereof.

In some examples, the gap configuration indication component 1250 may be configured as or otherwise support a means for the gap includes a number of slots between each repetition of the group-common downlink shared channel, where a length of each slot is based on a configuration of a bandwidth part used for carrying the group-common downlink shared channel.

In some examples, the gap configuration indication component 1250 may be configured as or otherwise support a means for the gap is configured independently for the one or more downlink shared channel and for the one or more semi-persistent downlink shared channels.

In some examples, the gap configuration indication component 1250 may be configured as or otherwise support a means for the number of repetitions combined with the gap between the repetitions does not exceed a periodicity configured for a semi-persistent downlink shared channel.

In some examples, the acknowledgment component 1255 may be configured as or otherwise support a means for receiving, from the one or more UEs, an acknowledgment feedback message for the group-common downlink shared channel based on the transmitting the group-common downlink shared channel, where the acknowledgment feedback message indicates a successful or unsuccessful reception of the group-common downlink shared channel based on the number of repetitions.

In some examples, the acknowledgment component 1255 may be configured as or otherwise support a means for transmitting a configuration for a Type 1 acknowledgment codebook for the one or more UEs to transmit the acknowledgment feedback message, where the acknowledgment feedback message is received based on the Type 1 acknowledgment codebook.

In some examples, the acknowledgment component 1255 may be configured as or otherwise support a means for transmitting a configuration for a Type 2 acknowledgment codebook for the one or more UEs to transmit the acknowledgment feedback message, where the acknowledgment feedback message is received based on the Type 2 acknowledgment codebook.

In some examples, the repetition configuration indication component 1230 may be configured as or otherwise support a means for the repetition configuration includes a group radio network temporary identifier indicating the group-common downlink shared channel is transmitted for the one or more UEs.

Figure 13:
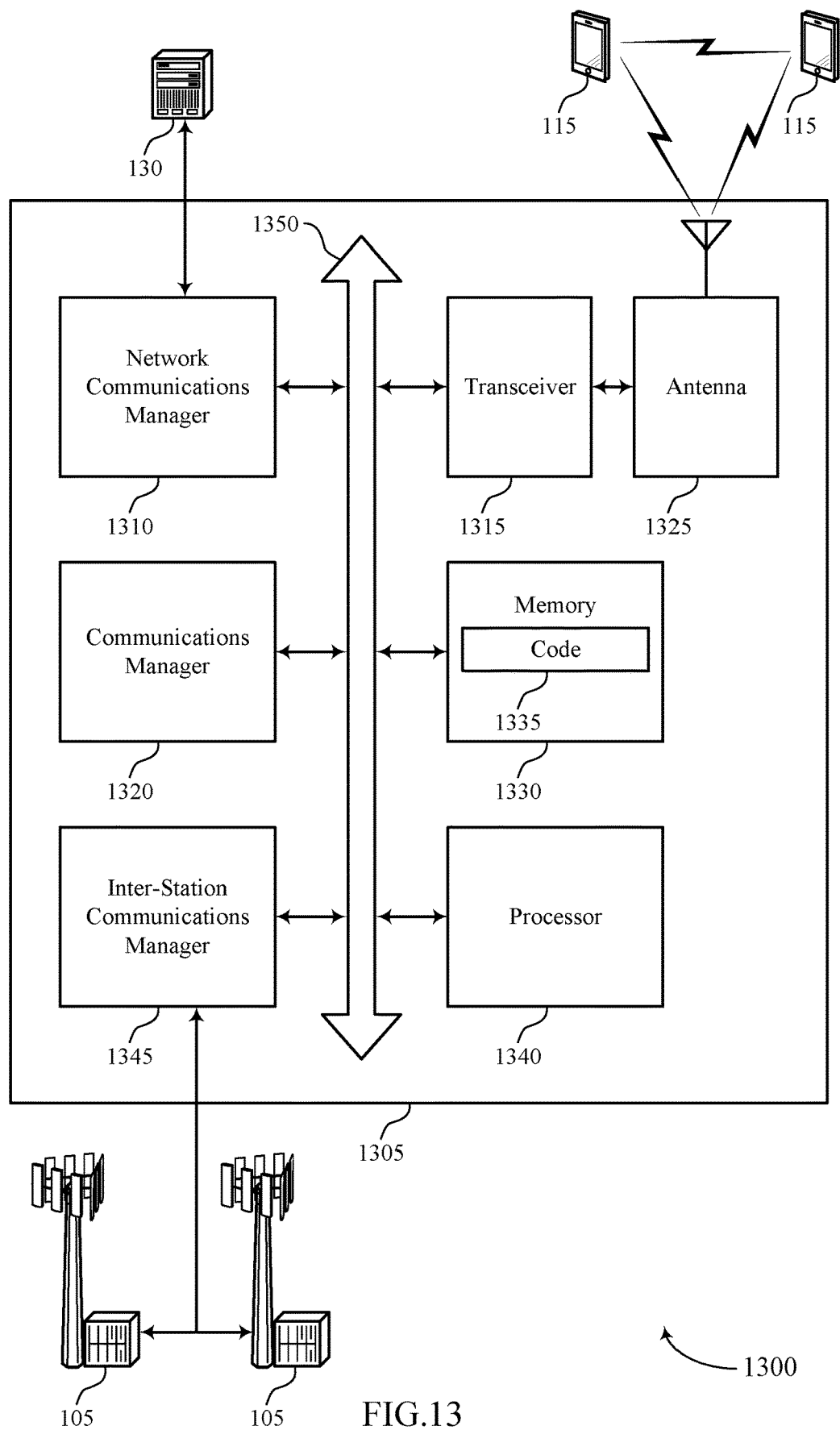
FIG. 13 shows a diagram of a system including a device that supports configurations for group-common downlink channels with repetitions in accordance with aspects of the present disclosure.

FIG. 13 shows a diagram of a system 1300 including a device 1305 that supports configurations for group-common downlink channels with repetitions in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, including a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets and provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting configurations for group-common downlink channels with repetitions). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for determining a number of repetitions for a group-common downlink shared channel, the group-common downlink shared channel including one or more downlink shared channels, one or more semi-persistent downlink shared channels different from the one or more downlink shared channels, or a combination thereof. The communications manager 1320 may be configured as or otherwise support a means for transmitting, to one or more user equipment (UEs), a repetition configuration for the group-common downlink shared channel, the repetition configuration including an indication for the determined number of repetitions. The communications manager 1320 may be configured as or otherwise support a means for transmitting, to the one or more UEs, the group-common downlink shared channel based on the determined number of repetitions.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of configurations for group-common downlink channels with repetitions as described herein, or the processor 1340 and the memory 1330 may be otherwise configured to perform or support such operations.

Figure 14:
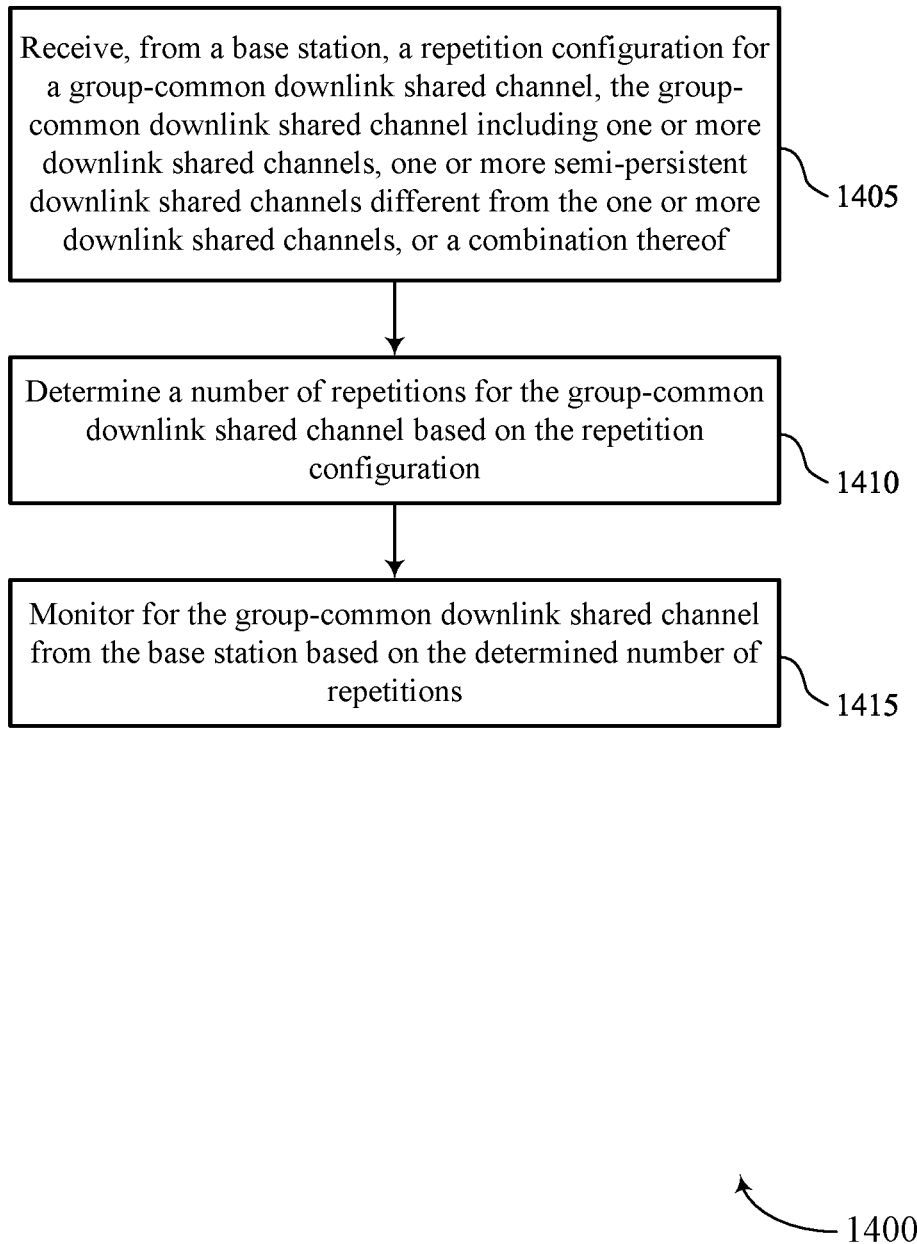
FIGS. 14 through 19 show flowcharts illustrating methods that support configurations for group-common downlink channels with repetitions in accordance with aspects of the present disclosure.

FIG. 14 shows a flowchart illustrating a method 1400 that supports configurations for group-common downlink channels with repetitions in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a repetition configuration for a group-common downlink shared channel, the group-common downlink shared channel including one or more downlink shared channels, one or more semi-persistent downlink shared channels different from the one or more downlink shared channels, or a combination thereof. The operations of 1405 may be performed in accordance with examples as disclosed herein. In some examples, aspects of the operations of 1405 may be performed by a repetition configuration component 825 as described with reference to FIG. 8.

At 1410, the method may include determining a number of repetitions for the group-common downlink shared channel based on the repetition configuration. The operations of 1410 may be performed in accordance with examples as disclosed herein. In some examples, aspects of the operations of 1410 may be performed by a repetition determination component 830 as described with reference to FIG. 8.

At 1415, the method may include monitoring for the group-common downlink shared channel from the base station based on the determined number of repetitions. The operations of 1415 may be performed in accordance with examples as disclosed herein. In some examples, aspects of the operations of 1415 may be performed by a group-common downlink shared channel monitoring component 835 as described with reference to FIG. 8.

Figure 15:
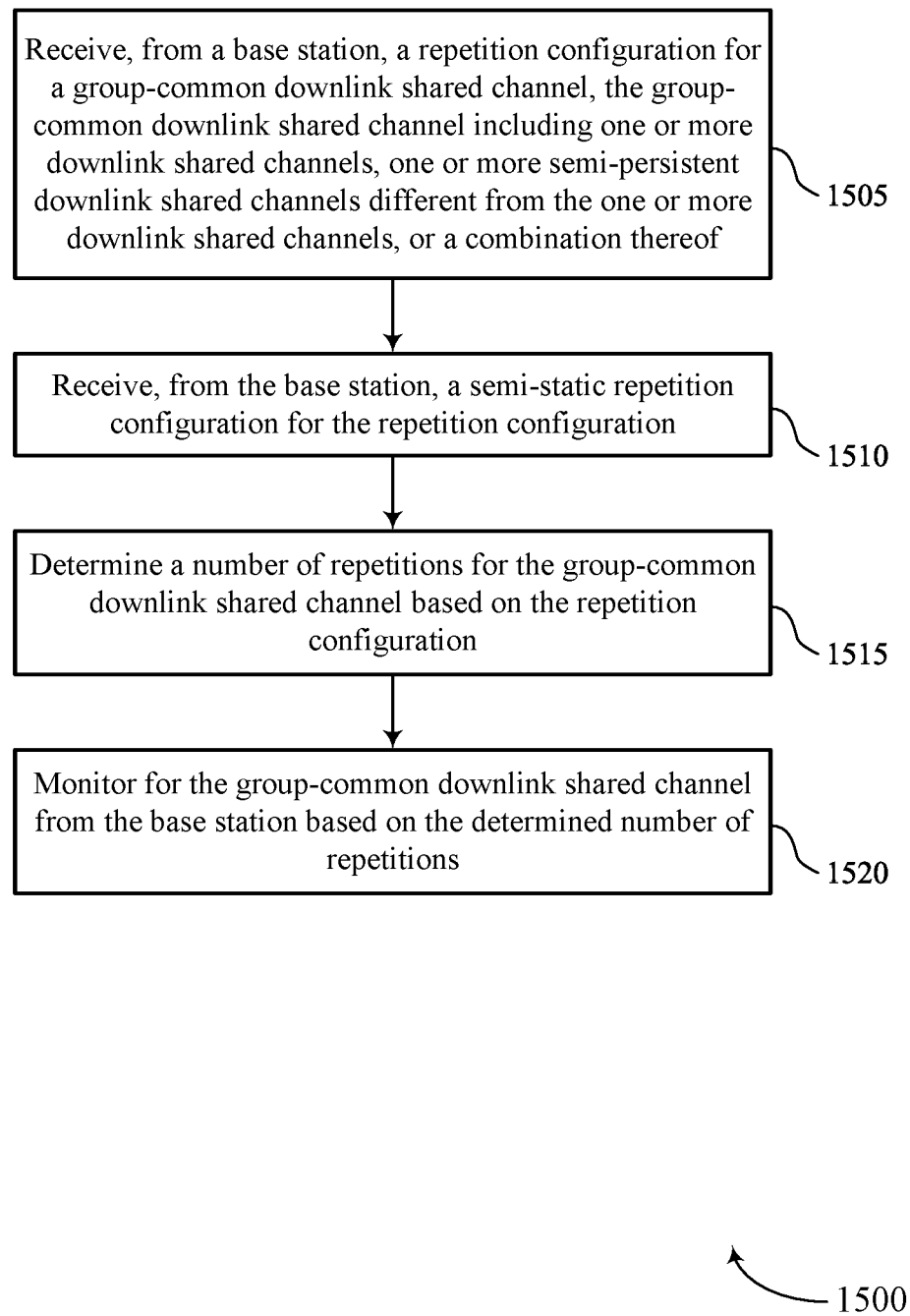

FIG. 15 shows a flowchart illustrating a method 1500 that supports configurations for group-common downlink channels with repetitions in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a repetition configuration for a group-common downlink shared channel, the group-common downlink shared channel including one or more downlink shared channels, one or more semi-persistent downlink shared channels different from the one or more downlink shared channels, or a combination thereof. The operations of 1505 may be performed in accordance with examples as disclosed herein. In some examples, aspects of the operations of 1505 may be performed by a repetition configuration component 825 as described with reference to FIG. 8.

At 1510, the method may include receiving, from the base station, a semi-static repetition configuration for the repetition configuration. The operations of 1510 may be performed in accordance with examples as disclosed herein. In some examples, aspects of the operations of 1510 may be performed by a semi-static repetition component 840 as described with reference to FIG. 8.

At 1515, the method may include determining a number of repetitions for the group-common downlink shared channel based on the repetition configuration. The operations of 1515 may be performed in accordance with examples as disclosed herein. In some examples, aspects of the operations of 1515 may be performed by a repetition determination component 830 as described with reference to FIG. 8.

At 1520, the method may include monitoring for the group-common downlink shared channel from the base station based on the determined number of repetitions. The operations of 1520 may be performed in accordance with examples as disclosed herein. In some examples, aspects of the operations of 1520 may be performed by a group-common downlink shared channel monitoring component 835 as described with reference to FIG. 8.

Figure 16:
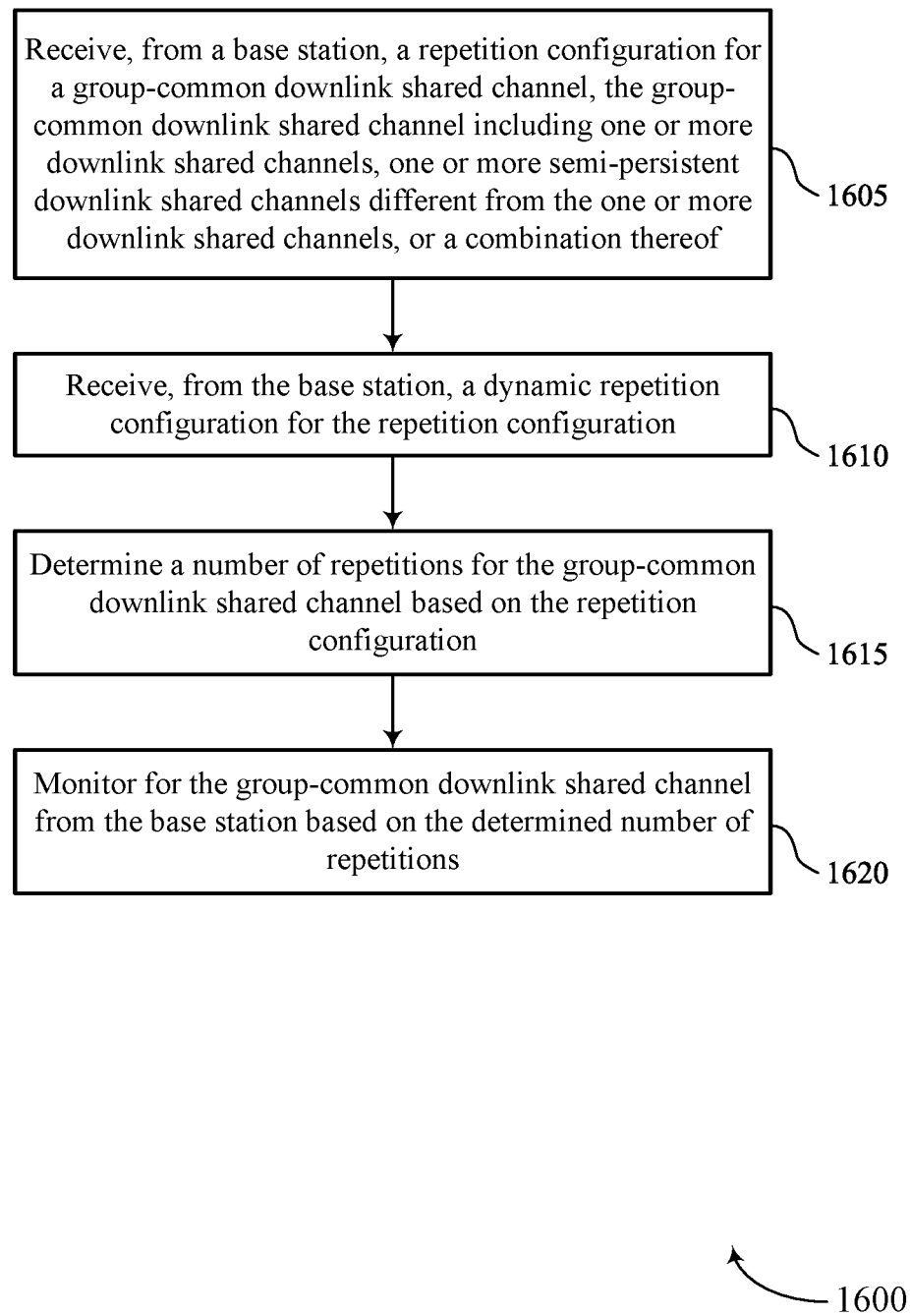

FIG. 16 shows a flowchart illustrating a method 1600 that supports configurations for group-common downlink channels with repetitions in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a repetition configuration for a group-common downlink shared channel, the group-common downlink shared channel including one or more downlink shared channels, one or more semi-persistent downlink shared channels different from the one or more downlink shared channels, or a combination thereof. The operations of 1605 may be performed in accordance with examples as disclosed herein. In some examples, aspects of the operations of 1605 may be performed by a repetition configuration component 825 as described with reference to FIG. 8.

At 1610, the method may include receiving, from the base station, a dynamic repetition configuration for the repetition configuration. The operations of 1610 may be performed in accordance with examples as disclosed herein. In some examples, aspects of the operations of 1610 may be performed by a dynamic repetition component 845 as described with reference to FIG. 8.

At 1615, the method may include determining a number of repetitions for the group-common downlink shared channel based on the repetition configuration. The operations of 1615 may be performed in accordance with examples as disclosed herein. In some examples, aspects of the operations of 1615 may be performed by a repetition determination component 830 as described with reference to FIG. 8.

At 1620, the method may include monitoring for the group-common downlink shared channel from the base station based on the determined number of repetitions. The operations of 1620 may be performed in accordance with examples as disclosed herein. In some examples, aspects of the operations of 1620 may be performed by a group-common downlink shared channel monitoring component 835 as described with reference to FIG. 8.

Figure 17:
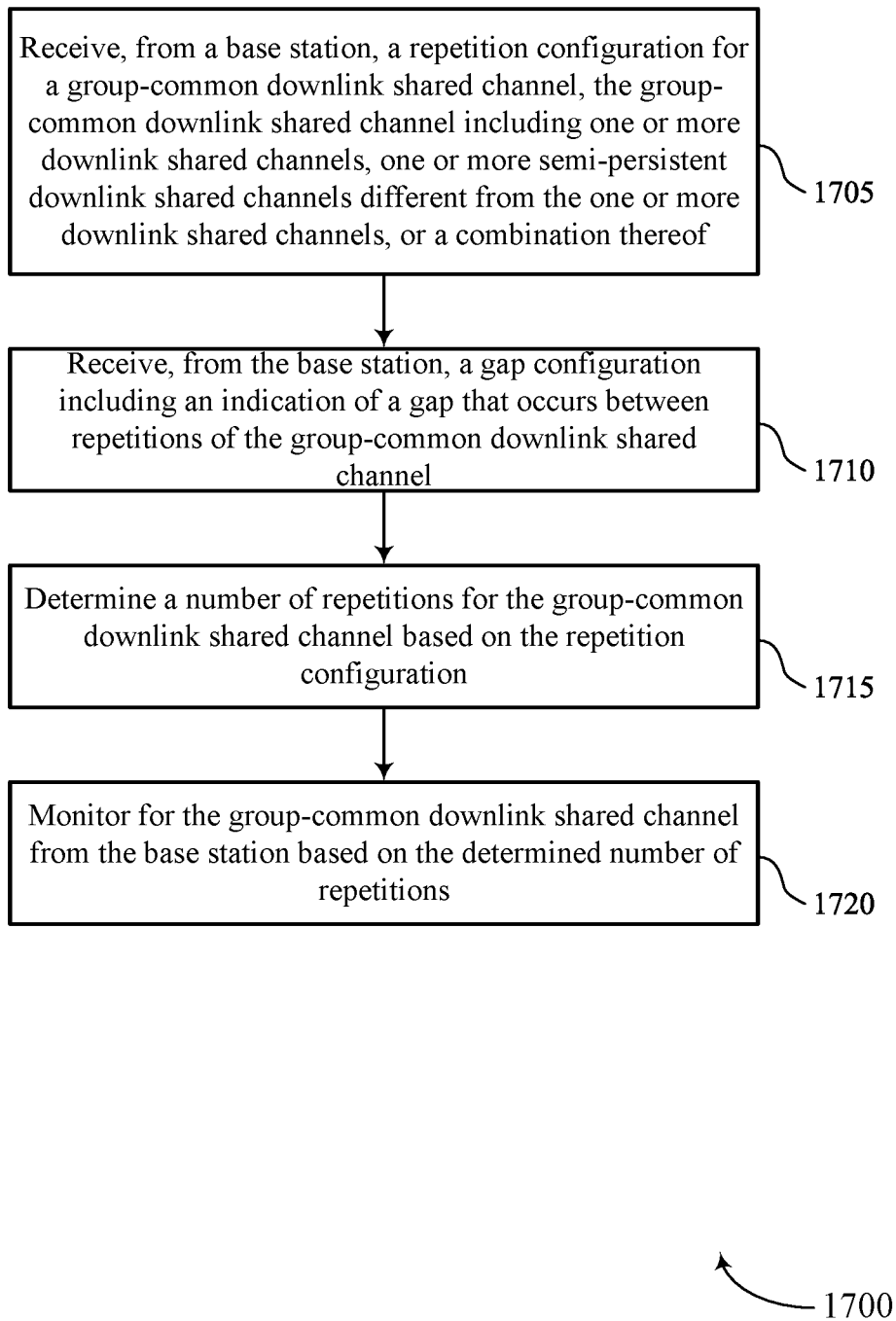

FIG. 17 shows a flowchart illustrating a method 1700 that supports configurations for group-common downlink channels with repetitions in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a repetition configuration for a group-common downlink shared channel, the group-common downlink shared channel including one or more downlink shared channels, one or more semi-persistent downlink shared channels different from the one or more downlink shared channels, or a combination thereof. The operations of 1705 may be performed in accordance with examples as disclosed herein. In some examples, aspects of the operations of 1705 may be performed by a repetition configuration component 825 as described with reference to FIG. 8.

At 1710, the method may include receiving, from the base station, a gap configuration including an indication of a gap that occurs between repetitions of the group-common downlink shared channel. The operations of 1710 may be performed in accordance with examples as disclosed herein. In some examples, aspects of the operations of 1710 may be performed by a gap configuration component 850 as described with reference to FIG. 8.

At 1715, the method may include determining a number of repetitions for the group-common downlink shared channel based on the repetition configuration. The operations of 1715 may be performed in accordance with examples as disclosed herein. In some examples, aspects of the operations of 1715 may be performed by a repetition determination component 830 as described with reference to FIG. 8.

At 1720, the method may include monitoring for the group-common downlink shared channel from the base station based on the determined number of repetitions. The operations of 1720 may be performed in accordance with examples as disclosed herein. In some examples, aspects of the operations of 1720 may be performed by a group-common downlink shared channel monitoring component 835 as described with reference to FIG. 8.

Figure 18:
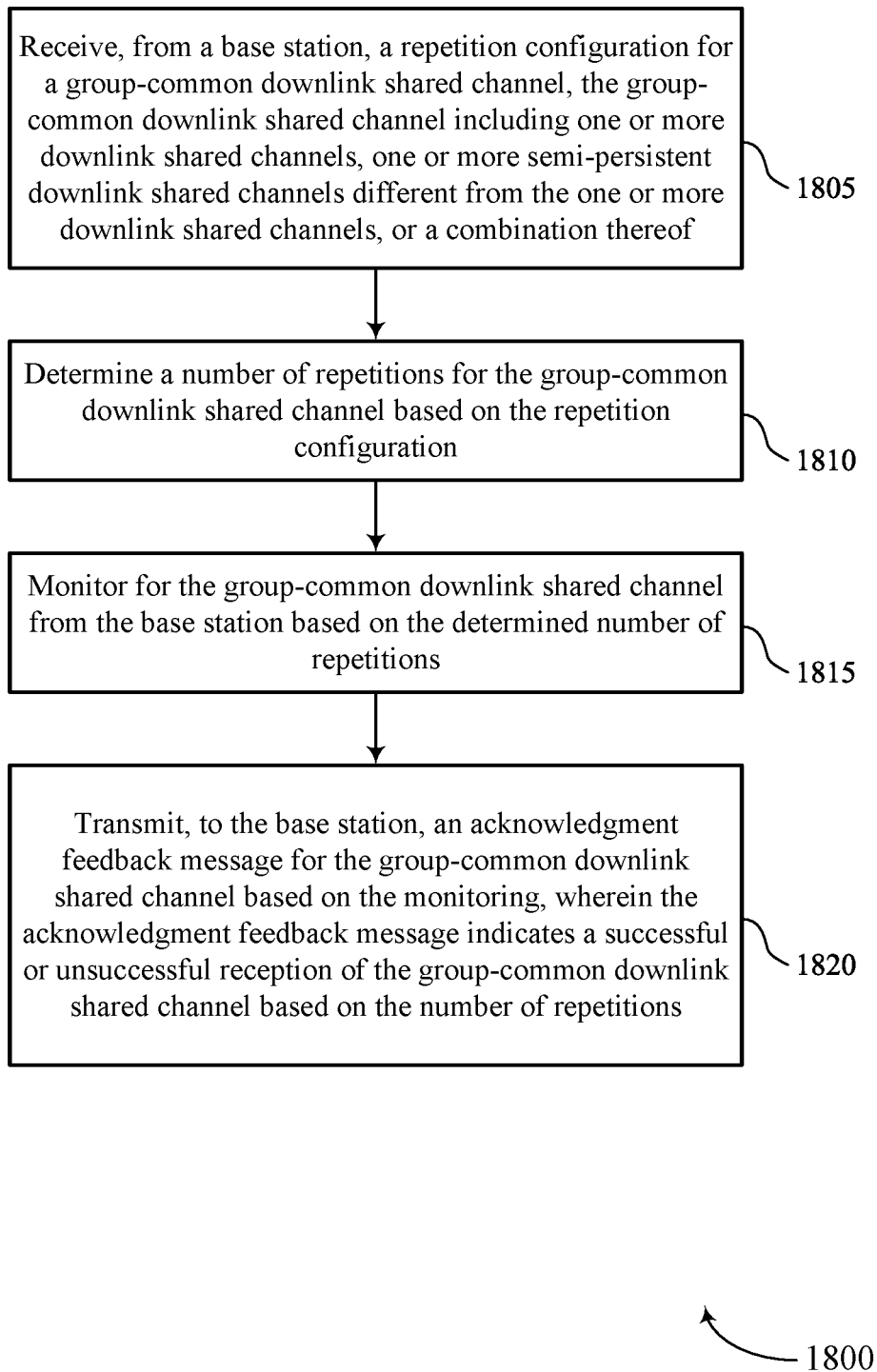

FIG. 18 shows a flowchart illustrating a method 1800 that supports configurations for group-common downlink channels with repetitions in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, a repetition configuration for a group-common downlink shared channel, the group-common downlink shared channel including one or more downlink shared channels, one or more semi-persistent downlink shared channels different from the one or more downlink shared channels, or a combination thereof. The operations of 1805 may be performed in accordance with examples as disclosed herein. In some examples, aspects of the operations of 1805 may be performed by a repetition configuration component 825 as described with reference to FIG. 8.

At 1810, the method may include determining a number of repetitions for the group-common downlink shared channel based on the repetition configuration. The operations of 1810 may be performed in accordance with examples as disclosed herein. In some examples, aspects of the operations of 1810 may be performed by a repetition determination component 830 as described with reference to FIG. 8.

At 1815, the method may include monitoring for the group-common downlink shared channel from the base station based on the determined number of repetitions. The operations of 1815 may be performed in accordance with examples as disclosed herein. In some examples, aspects of the operations of 1815 may be performed by a group-common downlink shared channel monitoring component 835 as described with reference to FIG. 8.

At 1820, the method may include transmitting, to the base station, an acknowledgment feedback message for the group-common downlink shared channel based on the monitoring, where the acknowledgment feedback message indicates a successful or unsuccessful reception of the group-common downlink shared channel based on the number of repetitions. The operations of 1820 may be performed in accordance with examples as disclosed herein. In some examples, aspects of the operations of 1820 may be performed by an acknowledgment feedback component 855 as described with reference to FIG. 8.

Figure 19:
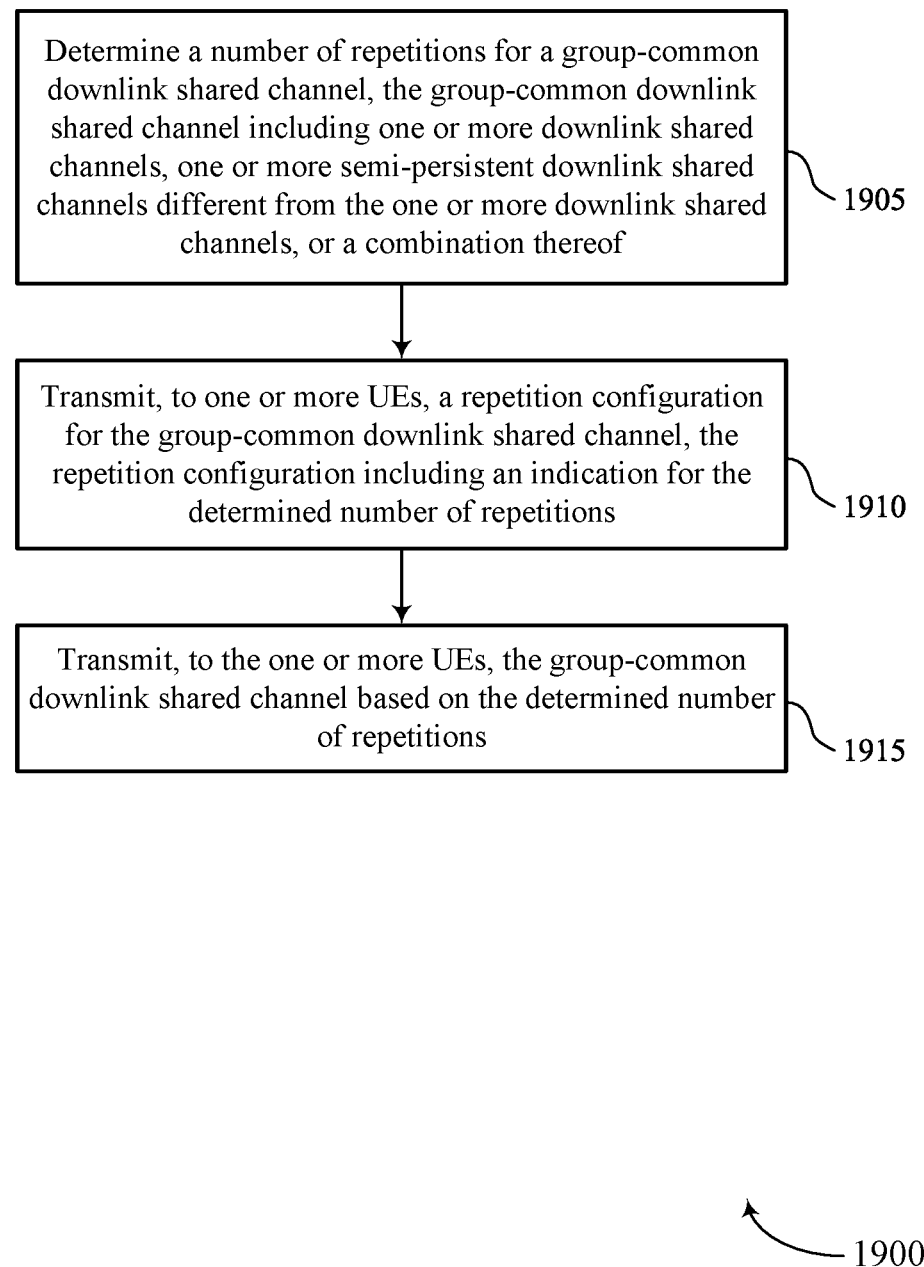

FIG. 19 shows a flowchart illustrating a method 1900 that supports configurations for group-common downlink channels with repetitions in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include determining a number of repetitions for a group-common downlink shared channel, the group-common downlink shared channel including one or more downlink shared channels, one or more semi-persistent downlink shared channels different from the one or more downlink shared channels, or a combination thereof. The operations of 1905 may be performed in accordance with examples as disclosed herein. In some examples, aspects of the operations of 1905 may be performed by a repetition number determination component 1225 as described with reference to FIG. 12.

At 1910, the method may include transmitting, to one or more user equipment (UEs), a repetition configuration for the group-common downlink shared channel, the repetition configuration including an indication for the determined number of repetitions. The operations of 1910 may be performed in accordance with examples as disclosed herein. In some examples, aspects of the operations of 1910 may be performed by a repetition configuration indication component 1230 as described with reference to FIG. 12.

At 1915, the method may include transmitting, to the one or more UEs, the group-common downlink shared channel based on the determined number of repetitions. The operations of 1915 may be performed in accordance with examples as disclosed herein. In some examples, aspects of the operations of 1915 may be performed by a group-common downlink shared channel component 1235 as described with reference to FIG. 12.

It should be noted that the methods described herein describe possible implementations, and that the operations and the steps may be rearranged or otherwise modified and that other implementations are possible. Further, aspects from two or more of the methods may be combined.

The following provides an overview of examples of the present invention:

Example 1: A method for wireless communications at a user equipment (UE), comprising: receiving, from a base station, a repetition configuration for a group-common downlink shared channel, the group-common downlink shared channel comprising one or more downlink shared channels, one or more semi-persistent downlink shared channels different from the one or more downlink shared channels, or a combination thereof; determining a number of repetitions for the group-common downlink shared channel based at least in part on the repetition configuration; and monitoring for the group-common downlink shared channel from the base station based at least in part on the determined number of repetitions.

Example 2: The method of example 1, wherein receiving the group-common configuration for the downlink shared channel comprises: receiving, from the base station, a semi-static repetition configuration for the repetition configuration.

Example 3: The method of example 2, wherein receiving the semi-static repetition configuration comprises: receiving, from the base station, the semi-static repetition configuration via radio resource control signaling.

Example 4: The method of any one of examples 2 through 3, wherein the semi-static repetition configuration comprises a group aggregation factor, wherein the number of repetitions is determined based at least in part on the group aggregation factor and on the group-common downlink shared channel.

Example 5: The method of example 4, wherein the group aggregation factor for the one or more group-common downlink shared channels or the one or more semi-persistent group-common downlink shared channels is predefined as one.

Example 6: The method of any one of examples 4 through 5, further comprising: determining the group aggregation factor for the one or more semi-persistent group-common downlink shared channels based at least in part on the group aggregation factor for the one or more group-common downlink shared channels, wherein the repetition configuration comprises group radio network temporary identifiers associated with the one or more semi-persistent group-common downlink shared channels.

Example 7: The method of any one of examples 4 through 6, further comprising: determining the group aggregation factor for the one or more group-common downlink shared channels with a group radio network temporary identifier based at least in part on an aggregation factor of a unicast downlink shared channel configured to the UE.

Example 8: The method of example 1, wherein receiving the configuration for the downlink shared channel comprises: receiving, from the base station, a dynamic repetition configuration for the repetition configuration.

Example 9: The method of example 8, wherein the dynamic repetition configuration comprises a group repetition number parameter via a time-domain resource allocation indication, wherein the number of repetitions is determined based at least in part on the group repetition number parameter.

Example 10: The method of any one of examples 1 through 9, further comprising: receiving, from the base station, a gap configuration comprising an indication of a gap that occurs between repetitions of the group-common downlink shared channel.

Example 11: The method of example 10, wherein receiving the gap configuration comprises: receiving, from the base station, the gap configuration semi-statically via radio resource control signaling, dynamically via a time domain resource allocation indication comprising a gap value for the gap, or a combination thereof.

Example 12: The method of any one of examples 10 through 11, wherein the gap comprises a number of slots between each repetition of the group-common downlink shared channel, wherein a length of each slot is based at least in part on a configuration of a bandwidth part used for carrying the group-common downlink shared channel.

Example 13: The method of any one of examples 10 through 12, wherein the gap is configured independently for the one or more downlink shared channels and for the one or more semi-persistent downlink shared channels.

Example 14: The method of any one of examples 10 through 13, wherein the number of repetitions combined with the gap between the repetitions does not exceed a periodicity configured for a semi-persistent downlink shared channel.

Example 15: The method of any one of examples 1 through 14, further comprising: transmitting, to the base station, an acknowledgment feedback message for the group-common downlink shared channel based at least in part on the monitoring, wherein the acknowledgment feedback message indicates a successful or unsuccessful reception of the group-common downlink shared channel based at least in part on the number of repetitions.

Example 16: The method of example 15, further comprising: receiving, from the base station, a configuration for a Type 1 acknowledgment codebook for transmitting the acknowledgment feedback message.

Example 17: The method of example 16, further comprising: determining a plurality of occasions for the monitoring for the group-common downlink shared channel based at least in part on the number of repetitions and a gap value representing a gap between each repetition of the group-common downlink shared channel; and transmitting, to the base station, a single acknowledgment feedback message for the plurality of occasions based at least in part on the Type 1 acknowledgment codebook.

Example 18: The method of example 15, further comprising: receiving, from the base station, a configuration for a Type 2 acknowledgment codebook for transmitting the acknowledgment feedback message.

Example 19: The method of example 18, further comprising: determining a plurality of occasions for the monitoring for the group-common downlink shared channel based at least in part on a feedback timing indicator field value between a last repetition of the group-common downlink shared channel and the acknowledgment feedback message, an offset value between a downlink control channel carrying the repetition configuration and a first repetition of the group-common downlink shared channel, the number of repetitions, a gap value representing a gap between each repetition of the group-common downlink shared channel, or a combination thereof; and transmitting, to the base station, the acknowledgment feedback message for the plurality of occasions based at least in part on the Type 2 acknowledgment codebook.

Example 20: The method of any one of examples 1 through 19, wherein the repetition configuration comprises a group radio network temporary identifier shared by a plurality of UEs including at least the UE.

Example 21: A method for wireless communications at a base station, comprising: determining a number of repetitions for a group-common downlink shared channel, the group-common downlink shared channel comprising one or more downlink shared channels, one or more semi-persistent downlink shared channels different from the one or more downlink shared channels, or a combination thereof; transmitting, to one or more user equipment (UEs), a repetition configuration for the group-common downlink shared channel, the repetition configuration comprising an indication for the determined number of repetitions; and transmitting, to the one or more UEs, the group-common downlink shared channel based at least in part on the determined number of repetitions.

Example 22: The method of example 21, wherein transmitting the group-common configuration for the downlink shared channel comprises: transmitting, to the one or more UEs, a semi-static repetition configuration for the repetition configuration.

Example 23: The method of example 22, wherein transmitting the semi-static repetition configuration comprises: transmitting, to the one or more UEs, the semi-static repetition configuration via radio resource control signaling.

Example 24: The method of any one of examples 22 through 23, wherein the semi-static repetition configuration comprises a group aggregation factor, wherein the number of repetitions is indicated based at least in part on the group aggregation factor and on the group-common downlink shared channel.

Example 25: The method of example 21, wherein transmitting the configuration for the downlink shared channel comprises: transmitting, to the one or more UEs, a dynamic repetition configuration for the repetition configuration.

Example 26: The method of example 25, wherein the dynamic repetition configuration comprises a group repetition number parameter via a time-domain resource allocation indication, wherein the number of repetitions is indicated based at least in part on the group repetition number parameter.

Example 27: The method of any one of examples 21 through 26, further comprising: transmitting, to the one or more UEs, a gap configuration comprising an indication of a gap that occurs between repetitions of the group-common downlink shared channel.

Example 28: The method of example 27, wherein transmitting the gap configuration comprises: transmitting, to the one or more UEs, the gap configuration semi-statically via radio resource control signaling, dynamically via a time domain resource allocation indication comprising a gap value for the gap, or a combination thereof.

Example 29: The method of any one of examples 27 through 28, wherein the gap comprises a number of slots between each repetition of the group-common downlink shared channel, wherein a length of each slot is based at least in part on a configuration of a bandwidth part used for carrying the group-common downlink shared channel.

Example 30: The method of any one of examples 27 through 29, wherein the gap is configured independently for the one or more downlink shared channel and for the one or more semi-persistent downlink shared channels.

Example 31: The method of any one of examples 27 through 30, wherein the number of repetitions combined with the gap between the repetitions does not exceed a periodicity configured for a semi-persistent downlink shared channel.

Example 32: The method of any one of examples 21 through 31, further comprising: receiving, from the one or more UEs, an acknowledgment feedback message for the group-common downlink shared channel based at least in part on the transmitting the group-common downlink shared channel, wherein the acknowledgment feedback message indicates a successful or unsuccessful reception of the group-common downlink shared channel based at least in part on the number of repetitions.

Example 33: The method of example 32, further comprising: transmitting a configuration for a Type 1 acknowledgment codebook for the one or more UEs to transmit the acknowledgment feedback message, wherein the acknowledgment feedback message is received based at least in part on the Type 1 acknowledgment codebook.

Example 34: The method of any one of examples 32 through 33, further comprising: transmitting a configuration for a Type 2 acknowledgment codebook for the one or more UEs to transmit the acknowledgment feedback message, wherein the acknowledgment feedback message is received based at least in part on the Type 2 acknowledgment codebook.

Example 35: The method of any one of examples 21 through 34, wherein the repetition configuration comprises a group radio network temporary identifier indicating the group-common downlink shared channel is transmitted for the one or more UEs.

Example 36: An apparatus for wireless communications at a user equipment (UE) comprising at least one means for performing a method of any one of examples 1 through 20.

Example 37: An apparatus for wireless communications at a user equipment (UE) comprising a processor and memory coupled to the processor, the processor and memory configured to perform a method of any one of examples 1 through 20.

Example 39: A non-transitory computer-readable medium storing code for wireless communications at a user equipment (UE) the code comprising instructions executable by a processor to perform a method of any one of examples 1 through 20.

Example 40: An apparatus for wireless communications at a base station comprising at least one means for performing a method of any one of examples 21 through 35.

Example 41: An apparatus for wireless communications at a base station comprising a processor and memory coupled to the processor, the processor and memory configured to perform a method of any one of examples 21 through 35.

Example 43: A non-transitory computer-readable medium storing code for wireless communications at a base station the code comprising instructions executable by a processor to perform a method of any one of examples 21 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, from a base station, a repetition configuration for a group-common downlink shared channel, the group-common downlink shared channel comprising one or more downlink shared channels, one or more semi-persistent downlink shared channels different from the one or more downlink shared channels, or a combination thereof;
determining a number of repetitions for the group-common downlink shared channel based at least in part on the repetition configuration; and
receiving the group-common downlink shared channel from the base station based at least in part on the determined number of repetitions.

2. The method of claim 1, wherein receiving the repetition configuration for the group-common downlink shared channel comprises:
receiving, from the base station, a semi-static repetition configuration for the repetition configuration via radio resource control signaling.

3. The method of claim 2, wherein the semi-static repetition configuration comprises a group aggregation factor for multicast transmissions, wherein the number of repetitions is determined based at least in part on the group aggregation factor and on the group-common downlink shared channel.

4. The method of claim 3, wherein the group aggregation factor for the one or more downlink shared channels or the one or more semi-persistent downlink shared channels is predefined as one.

5. The method of claim 3, further comprising:
determining the group aggregation factor for the one or more semi-persistent downlink shared channels based at least in part on the group aggregation factor for the one or more downlink shared channels, wherein the repetition configuration comprises group radio network temporary identifiers associated with the one or more semi-persistent downlink shared channels.

6. The method of claim 3, further comprising:
determining the group aggregation factor for the one or more downlink shared channels with a group radio network temporary identifier based at least in part on an aggregation factor of a unicast downlink shared channel configured to the UE.

7. The method of claim 1, wherein receiving the repetition configuration for the group-common downlink shared channel comprises:
receiving, from the base station, a dynamic repetition configuration for the repetition configuration.

8. The method of claim 7, wherein the dynamic repetition configuration comprises a group repetition number parameter via a time-domain resource allocation indication, wherein the number of repetitions is determined based at least in part on the group repetition number parameter.

9. The method of claim 7, wherein receiving the repetition configuration for the group-common downlink shared channel comprises:
receiving, from the base station, a semi-static repetition configuration for the repetition configuration, wherein the UE applies one of the semi-static repetition configuration or the dynamic repetition configuration.

10. The method of claim 7, wherein receiving the repetition configuration for the group-common downlink shared channel comprises:
receiving, from the base station, a semi-static repetition configuration for the repetition configuration, wherein the semi-static repetition configuration and the dynamic repetition configuration are configured independently with different group radio network temporary identifiers (G-RNTIs) or configured scheduled G-RNTIs (G-CS-RNTIs).

11. The method of claim 1, further comprising:
receiving, from the base station, a gap configuration comprising an indication of a gap that occurs between repetitions of the group-common downlink shared channel.

12. The method of claim 11, wherein receiving the gap configuration comprises:
receiving, from the base station, the gap configuration semi-statically via radio resource control signaling, dynamically via a time domain resource allocation indication comprising a gap value for the gap, or a combination thereof.

13. The method of claim 11, wherein the gap comprises a number of slots between each repetition of the group-common downlink shared channel, wherein a length of each slot is based at least in part on a configuration of a bandwidth part used for carrying the group-common downlink shared channel.

14. The method of claim 11, wherein the gap is configured independently for the one or more downlink shared channels and for the one or more semi-persistent downlink shared channels.

15. The method of claim 11, wherein the number of repetitions combined with the gap between the repetitions does not exceed a periodicity configured for a semi-persistent downlink shared channel.

16. The method of claim 1, further comprising:
transmitting, to the base station, an acknowledgment feedback message for the group-common downlink shared channel based at least in part on the received group-common downlink shared channel, wherein the acknowledgment feedback message indicates a successful or unsuccessful reception of the group-common downlink shared channel based at least in part on the number of repetitions.

17. The method of claim 16, further comprising:
receiving, from the base station, a configuration for a Type 1 acknowledgment codebook for transmitting the acknowledgment feedback message.

18. The method of claim 17, further comprising:
determining a plurality of occasions for monitoring to receive the group-common downlink shared channel based at least in part on the number of repetitions and a gap value representing a gap between each repetition of the group-common downlink shared channel; and
transmitting, to the base station, a single acknowledgment feedback message for the plurality of occasions based at least in part on the Type 1 acknowledgment codebook.

19. The method of claim 16, further comprising:
receiving, from the base station, a configuration for a Type 2 acknowledgment codebook for transmitting the acknowledgment feedback message.

20. The method of claim 19, further comprising:
determining a plurality of occasions for monitoring to receive the group-common downlink shared channel based at least in part on a feedback timing indicator field value between a last repetition of the group-common downlink shared channel and the acknowledgment feedback message, an offset value between a downlink control channel carrying the repetition configuration and a first repetition of the group-common downlink shared channel, the number of repetitions, a gap value representing a gap between each repetition of the group-common downlink shared channel, or a combination thereof; and transmitting, to the base station, the acknowledgment feedback message for the plurality of occasions based at least in part on the Type 2 acknowledgment codebook.

21. The method of claim 1, wherein the repetition configuration comprises a group radio network temporary identifier shared by a plurality of UEs including at least the UE.

22. An apparatus for wireless communications at a user equipment (UE), comprising:
one or more processors;
memory coupled with the one or more processors; and
instructions stored in the memory and executable by the one or more processors, individually or in any combination, to cause the apparatus to:
receive, from a base station, a repetition configuration for a group-common downlink shared channel, the group-common downlink shared channel comprising one or more downlink shared channels, one or more semi-persistent downlink shared channels different from the one or more downlink shared channels, or a combination thereof;
determine a number of repetitions for the group-common downlink shared channel based at least in part on the repetition configuration; and
receive the group-common downlink shared channel from the base station based at least in part on the determined number of repetitions.

23. The apparatus of claim 22, wherein the instructions to receive the repetition configuration for the group-common downlink shared channel are executable by the one or more processors to cause the apparatus to:
receive, from the base station, a semi-static repetition configuration for the repetition configuration via radio resource control signaling.

24. The apparatus of claim 23, wherein the semi-static repetition configuration comprises a group aggregation factor for multicast transmissions, wherein the number of repetitions is determined based at least in part on the group aggregation factor and on the group-common downlink shared channel.

25. The apparatus of claim 22, wherein the instructions to receive the repetition configuration for the group-common downlink shared channel are executable by the one or more processors to cause the apparatus to:
receive, from the base station, a dynamic repetition configuration for the repetition configuration.

26. The apparatus of claim 25, wherein the dynamic repetition configuration comprises a group repetition number parameter via a time-domain resource allocation indication,
the number of repetitions is determined based at least in part on the group repetition number parameter.

27. The apparatus of claim 22, wherein the instructions to receive the repetition configuration for the group-common downlink shared channel are executable by the one or more processors to cause the apparatus to:
receive, from the base station, a semi-static repetition configuration for the repetition configuration, wherein the UE is configured to apply one of the semi-static repetition configuration or a dynamic repetition configuration.

28. The apparatus of claim 22, wherein the instructions to receive the repetition configuration for the group-common downlink shared channel are executable by the one or more processors to cause the apparatus to:
receive, from the base station, a semi-static repetition configuration for the repetition configuration, wherein the semi-static repetition configuration and a dynamic repetition configuration are configured independently with different group radio network temporary identifiers (G-RNTIs) or configured scheduled G-RNTIs (G-CS-RNTIs).

29. An apparatus for wireless communications at a user equipment (UE), comprising:
means for receiving, from a base station, a repetition configuration for a group-common downlink shared channel, the group-common downlink shared channel comprising one or more downlink shared channels, one or more semi-persistent downlink shared channels different from the one or more downlink shared channels, or a combination thereof;
means for determining a number of repetitions for the group-common downlink shared channel based at least in part on the repetition configuration; and
means for receiving the group-common downlink shared channel from the base station based at least in part on the determined number of repetitions.

30. A non-transitory computer-readable medium storing code for wireless communications at a user equipment (UE), the code comprising instructions executable by one or more processors, individually or in any combination, to:
receive, from a base station, a repetition configuration for a group-common downlink shared channel, the group-common downlink shared channel comprising one or more downlink shared channels, one or more semi-persistent downlink shared channels different from the one or more downlink shared channels, or a combination thereof;
determine a number of repetitions for the group-common downlink shared channel based at least in part on the repetition configuration; and
receive the group-common downlink shared channel from the base station based at least in part on the determined number of repetitions.

* * * * *